(12) United States Patent
Theriault et al.

(10) Patent No.: US 9,517,897 B2
(45) Date of Patent: Dec. 13, 2016

(54) SYSTEM FOR REPOSITIONING FLAT-DISPOSED OBJECTS

(71) Applicant: CONCEPTION IMPACK DTCI INC., Saint-Jacques (CA)

(72) Inventors: Dominic Theriault, Saint-Jacques (CA); Mathieu Tremblay, Laval (CA); Jonathan Lemay, Sainte-Anne-des Plaines (CA)

(73) Assignee: CONCEPTION IMPACK DTCI INC., Saint-Jacques, Quebec (CA)

( * ) Notice: Subject to any disclaimer, the term of this patent is extended or adjusted under 35 U.S.C. 154(b) by 104 days.

(21) Appl. No.: 14/656,417

(22) Filed: Mar. 12, 2015

(65) Prior Publication Data

US 2015/0217946 A1     Aug. 6, 2015

Related U.S. Application Data

(63) Continuation of application No. PCT/CA2013/050701, filed on Sep. 12, 2013.

(30) Foreign Application Priority Data

Sep. 12, 2012   (CA) .................................... 2789538

(51) Int. Cl.
*B65G 47/68* (2006.01)
*B65G 47/244* (2006.01)
(Continued)

(52) U.S. Cl.
CPC .............. *B65G 47/68* (2013.01); *B65G 37/00* (2013.01); *B65G 47/244* (2013.01); *B65H 29/00* (2013.01);
(Continued)

(58) Field of Classification Search
CPC ....... B65G 13/10; B65G 37/00; B65G 47/244; B65G 47/646; B65G 47/68; B65H 29/60; B65H 29/6672; B65H 2301/4211; B65H 2301/4212; B65H 2301/4214; B65H 2701/1766
See application file for complete search history.

(56) References Cited

U.S. PATENT DOCUMENTS 3,348,678 A    10/1967  Flowers
3,593,624 A     7/1971  Dufour
(Continued)

FOREIGN PATENT DOCUMENTS

DE         9218640 U1     1/1995
DE        29700107 U1    10/1997
(Continued)

OTHER PUBLICATIONS

Machine translation in English of DE-9218640 U1.
(Continued)

*Primary Examiner* — Timothy Waggoner
*Assistant Examiner* — Keith R Campbell
(74) *Attorney, Agent, or Firm* — IPAXIO S.E.N.C.

(57) ABSTRACT

The system is provided for repositioning flat-disposed objects that can be arranged in an overlapping manner at a system inlet. The system includes a first and a second lateral deviation conveyor, each having an inlet located downstream the inlet of the system. The system also includes a diverting device creating a first transport circuit ending on the right side of a common receiving zone, and a second transport circuit ending on the left side of the common receiving zone. The system can invert the orientation of the objects transported in the first transport circuit with reference to the objects transported in the second transport circuit. The system can advantageously be used with objects having a variable thickness and in particular with folding cartons in a flat configuration.

15 Claims, 26 Drawing Sheets

US 9,517,897 B2
Page 2

(51) Int. Cl.
*B65H 29/00* (2006.01)
*B65G 37/00* (2006.01)

(52) U.S. Cl.
CPC .......... *B65H 2301/4211* (2013.01); *B65H 2701/1766* (2013.01)

(56) References Cited

U.S. PATENT DOCUMENTS

| | | | |
|---|---|---|---|
| 3,738,644 A | 6/1973 | Kluge et al. | |
| 3,859,898 A * | 1/1975 | Besserdich | B31B 19/94 270/45 |
| 4,065,117 A | 12/1977 | Thorsheim | |
| 4,091,916 A | 5/1978 | Warner | |
| 4,678,172 A | 7/1987 | Faltin | |
| 5,078,250 A | 1/1992 | Cole | |
| 5,078,260 A * | 1/1992 | Bensberg | B65H 29/60 198/447 |
| 5,158,278 A | 10/1992 | Auf Der Mauer | |
| 5,396,752 A | 3/1995 | Mastropasqua et al. | |
| 5,713,453 A | 2/1998 | Schornhorst et al. | |
| 6,594,974 B2 | 7/2003 | Theriault | |
| 6,792,741 B1 | 9/2004 | Theriault | |
| 6,918,588 B2 | 7/2005 | Muller | |
| 6,945,531 B2 | 9/2005 | Perobelli et al. | |
| 7,131,645 B2 | 11/2006 | Bodereau | |
| 7,360,636 B2 | 4/2008 | Theriault | |
| 7,624,855 B2 | 12/2009 | Martocchio et al. | |
| 7,967,124 B2 | 6/2011 | Theriault | |
| 8,286,408 B2 | 10/2012 | Chauhan | |
| 8,443,957 B2 | 5/2013 | Theriault | |
| 8,974,173 B2 * | 3/2015 | Dowiasch | A61F 13/55115 198/374 |
| 2013/0168207 A1 | 7/2013 | Viatte | |
| 2013/0233679 A1 | 9/2013 | Wolters et al. | |
| 2014/0291113 A1 | 10/2014 | Theriault et al. | |

FOREIGN PATENT DOCUMENTS

| | | |
|---|---|---|
| EP | 1179502 A2 | 2/2002 |
| EP | 1832531 B1 | 12/2008 |
| EP | 2230204 A1 | 9/2010 |
| EP | 1657200 B1 | 5/2014 |
| FR | 2518514 A1 | 6/1983 |
| WO | 2014040187 A1 | 3/2014 |

OTHER PUBLICATIONS

Machine translation in English of DE-29700107 U1.
Machine translation in English of EP-1179502 A2.
Machine translation in English of EP-2230204 A1.
Machine translation in English of FR-2518514 A1.
Translation in English prepared by WIPO of IPRP dated Jan. 6, 2015 issued in PCT/CA2013/050701.

* cited by examiner

SYSTEM FOR REPOSITIONING FLAT-DISPOSED OBJECTS

CROSS REFERENCE TO PRIOR APPLICATIONS

The present application is a continuation of PCT patent application No. PCT/CA2013/050701 filed on 12 Sep. 2013. PCT patent application No. PCT/CA2013/050701 claims priority of Canadian patent application No. 2,789,538 filed on 12 Sep. 2012. The contents of all these prior applications are hereby incorporated by reference in their entirety.

TECHNICAL FIELD

The technical field relates to repositioning of flat-disposed objects, for instance folding cartons in a flat configuration, disposed in an overlapping manner to optimize handling, in particular for transportation and storage in a container.

BACKGROUND

In the packaging industry, folding cartons are generally manufactured on a production line by folding and gluing carton blanks using a machine often called a folding-gluing machine. Folding cartons are usually produced as a continuous flow coming out of the outlet of a folding-gluing machine. The cartons then in a flat configuration, namely that the various panels of each carton are folded to essentially eliminate the entire internal volume thereof, thereby minimizing the space prior to initial use. Each flat-disposed carton has a length, a width and a thickness, the thickness being significantly less than the length and the width.

Folding cartons are generally arranged in an overlapping manner on a conveyor, usually a horizontally-disposed conveyor belt, which receives the cartons on its upper surface as it advances. Overlapping is done by partially placing the cartons on top of one another in the travel direction.

The flow of overlapping cartons forms what is called a shingled stream. A shingled stream includes a plurality of overlapping flat-disposed cartons. The shingled stream at the outlet of the folding-gluing machine is called the initial shingled stream. The initial shingled stream can be continuous or discontinuous. The initial shingled stream is discontinuous when two successive cartons therein are spaced apart from one another.

The folding cartons in flat configuration often have a non-uniform thickness. Some carton parts may be thicker than others. The maximum thickness is then often in the widthwise direction of the flat-disposed folding cartons. However, variants are possible. In any case, thickness variations complicate handling of cartons, in their transportation and storage in a container prior to the first use, for instance at the time when the cartons are unfolded to create a load volume. In the meantime, cartons remain in a flat configuration.

The maximum thickness is often along the edge corresponding to the bottom part of the unfolded carton, thus the part which is to become the bottom of the unfolded carton in use. During manufacturing, these folding cartons then output the folding-gluing machine in flat configuration and are oriented so that the leading edge, which is transversal to the travel direction, is the edge with the maximum thickness. The cartons are thinner at the transversal trailing edge. The folding cartons are then all identically oriented, which is not advantageous when the cartons must be stacked into batches. Each batch includes a certain number of cartons that may or may not be attached after stacking, for instance by a packaging machine. If there is a thicker edge on one of the sides, the symmetry of the batches will be affected and this will thus complicate batch stacking in view of transportation and storage of these batches. The solution is to alternate the relative direction of the cartons, for instance within the same batch, or from one batch to another, in order to optimize the space occupied by the cartons in a container. The relative repositioning from one carton to another is often called "inversion".

The folding cartons can be inverted manually but mechanical systems for repositioning them exist. These systems are, however, subject to challenges inherent to this type of operation. For example, known systems generally involve curves in the vertical plane that bend the cartons during in operation. This often makes it impossible to use the system with objects that are inflexible when in a flat configuration. Cartons made of corrugated cardboard or microflute cardboard are examples of objects that are inflexible in a flat configuration because they are made of a more rigid material than flat cardboard. Some microflute cardboard cartons can be damaged when subjected to even a slight bending beyond a critical angle, often less than 2 degrees from the median plane of the carton, thereby causing a permanent and generally aesthetically undesirable deformation on at least one of the major sides of the carton. These objects can be said to have a critical flexibility. Their handling in known systems would require dimensions that would be much too large, at least from a practical point of view, to keep the curvatures under their maximum bending angle. Still, the floor space in most factories is often not large enough to accommodate the required dimensions. On the other hand, it would be difficult, or even impossible, to modify an existing system designed for somewhat flexible objects in a flat configuration so as to handle inflexible objects in a flat configuration. Hence, the versatility of known systems is often limited.

Another challenge with systems for mechanically inverting cartons is their operating speed. The systems must be able to handle objects at the highest possible rate so as to optimize production and synchronize all operations. Increasing operating speeds is always desirable.

The following documents present different approaches for the repositioning objects, for instance folding cartons: EP 1 179 502; EP 1 657, 200; EP 2 230 204, U.S. Pat. No. 3,738,644; U.S. Pat. No. 4,678,172; U.S. Pat. No. 5,078,250; U.S. Pat. No. 5,158,278; U.S. Pat. No. 5,396,752; U.S. Pat. No. 7,360,636; U.S. Pat. No. 8,443,957; US-2003/116476; US-2005/061627; US-2005/285332; US-2012/000748; WO 2009/110979.

Despite what has been proposed over the years, improvements in this technical field are still, and continually, necessary.

SUMMARY

The proposed concept relates to a multi-purpose system capable of changing the orientation of flat-disposed objects, such as objects with a variable thickness, to form shingled stream with various configurations. Different examples of the multidirectional inversion of batches with flat-disposed objects are suggested, including object turning. This concept is particularly useful in packaging, such as for repositioning folding cartons that are in a flat configuration.

In some implementations, it is possible to include a helicoidal inversion system, such as one with a dynamic rollover.

Different implementation methods are possible. For example, one may consists in separating the inlet shingled stream into counted batches, diverting the successive batches into two transport sections, transferring the batches to a right-angle transfer conveyor and then merging them to form a continuous shingled stream of inverted batches at the outlet. The operating mode for this method, resulting in a horizontal inversion of the batches, is the following: the objects are provided in a shingled stream, for instance coming from the folding-gluing machine, are counted and then separated into batches. The diverting device must shift position within the time period and over the distance in-between two batches. The objects in the shingled stream are transported and then pivoted in their respective left or right transport sections. They are then transferred at right-angle with or without a separation in the final shingled stream, as desired. The final result is a shingled stream with object batches inverted horizontally.

Another implementation consists in pivoting shingled stream in addition to inverting the batches in succession. This combination of functionalities represents an advantage over shingled stream indexers that can only provide turning. The system can be used as a shingled stream turners capable of orienting the objects in the shingled stream always toward the left transport section (90-degree rotation to the right) or always toward the right section (90-degree rotation to the left) without using the diverting device. The objects are transferred at right-angle with or without separating the final shingled stream into counted batches.

Another use method consists in separating the inlet shingled stream into individual objects, diverting the counted objects into the transport section or sections, inverting the individual objects using one or more fixed or dynamic helicoidal sections, and recreating the shingled stream with batches of counted objects that are inverted in one or more possible directions. This use method can be accomplished in many ways, each having its own properties and arrangement of particular operation sequences providing at least one orientation in the shingled stream at the system outlet.

The system can include a fixed helicoidal inversion section, in which objects are individually counted and separated. The diverting device changes position after each time that it has counted the number of objects per batch and must complete the repositioned during the time period between two successive objects. This maximum acceptable repositioning time depends on maximum operating speed, in objects per hour, of the system. Each individual object follows the corresponding transport circuits of these batches and is pivoted over 90 degrees to the left or to the right. In one of the transport circuits, whether to the left or right, a fixed helicoidal inversion belt pivots each object around a Y-axis. Each individual object is then returned to the shingled stream on a right-angle transfer conveyor to form a new shingled stream including vertically inverted batches.

Another implementation is a system similar to the one presented above, but where the helicoidal section is omitted. Without the helicoidal inversion, batches are only inverted horizontally. Because horizontal inversion can cause issues in the packaging system and may not be acceptable for all kinds of objects, this implementation would not be as universal as the one with a vertical inversion. However, it has the advantage of reducing costs and the complexity related to the helicoidal inversion section.

Another possible implementation consists in using two dynamic helicoidal inversion sections, one in each transport section. The helicoidal inversion section would then have a system to twist and then straighten the belt while pivoting 180 degrees at one of the end of the helicoidal section. Each inversion section can be selected to pivot objects around the X-axis or to allow them to pass directly therein. This selection is done at the time of adjustments so that each helicoidal section remains in the same position during the operation, thus the repositioning time is not critical. This provides four different batch inversion configurations, namely: (1) no helicoidal inversion (horizontal inversion of batches); (2) left helicoidal inversion (vertical inversion of batches); (3) right helicoidal inversion (vertical inversion of batches); and (4) double helicoidal inversion (horizontal inversion of batches).

Another possible implementation is to only use one dynamic helicoidal inversion section. This inversion section would provide a faster repositioning element to shift from one position to the other in-between two objects. The inversion section would be located between the separation device and the diverting device so that each individual object could be inverted vertically or not before passing to the transport paths. This implementation could also provide all four batch inversion configurations.

Another implementation consists in providing the helicoidal inversion section after the right-angle transfer section. This combination would require only one transport circuit and a fast dynamic inversion section. This combination is simpler than the previous one, but does not allow all four different batch inversion configurations. Inversion would be vertical.

Another implementation consists in placing the (fast) dynamic helicoidal inversion section just before a compression section of a folding-gluing machine. This would require modifications to the components of the folding-gluing machine compared to the previous implementations, in which installation is at the standard output of a folding-gluing machine. However, it has the advantage of being located upstream the folding-gluing machine, hence to individually handle objects without the need of a pre-separation or separation section.

The proposed system can be used as a shingled stream turner capable of pivoting objects individually always toward the left transfer section (90-degree rotation to the right) or always toward the right section (90-degree rotation to the left) without using a diverting device. The cartons are indexed with the option of separating the final shingled stream into counted batches or not. The helicoidal sections can be used or not to create shingled streams with the desired orientation at the outlet.

Some implementations requires objects to remain in the shingled stream during pivoting operations. This means that objects are thus counted in the shingled stream with a specially designed sensor, then the shingled stream is separated into batches having a predetermined number of objects. The separation is done by a separation unit which comprises two independent conveyor sections, each having an upper belt and a bottom belt. The separation is done once the right number is reached, the first conveyor section then stopping and the second conveyor section accelerating to pull the objects that are between the belts of the second section.

The implementations allowing vertical inversion require the presence of a helicoidal inversion section on one of the two transport branches. Since objects cannot be inverted in the shingled stream in a helicoidal inversion section, which would result in an understacked shingled stream, they must be separated one by one by a separation device located in the inlet section of the system. To achieve this, there is provided a pressure-wheel resting by gravity on the objects in the shingled stream, for instance coming from the output of the folding-gluing machine. The longitudinal position of the wheel is calculated as a function of the length of the objects so that the end of the pressure-wheel holds the object following the one pulled by the separation belts.

Sometimes, for certain types of objects, particularly in the case of flat-disposed cartons, a preliminary pre-separation stage is necessary in order to increase the distance between each object and the next, and in order to facilitate complete separation. The system can then include a pre-separation device. The pre-separation device includes a pre-separation conveyor which is installed between the compression conveyor of the folding-gluing machine and the separation device, and two additional pressure-wheels provided so as to increase the shingled stream pitch and completely separate objects from one another using the separation device. As with the separation device, the pressure-wheels can be adjusted longitudinally and the longitudinal position of the wheels is calculated as a function of the length of the objects. One of the pressure-wheels presses the objects which accelerate and pre-separate while the other pressure-wheel holds the object after the one being pulled by the separation device.

The system inverts a predetermined number of objects per batch. To achieve this, a diverting device is provided right after the entry (counting-separation). The function of the diverting device is to successively divert a predetermined number of objects (disposed in a shingled stream or individually) in one of the two directions and then change the orientation of the diverting device to the other position, once the predetermined number of objects has been reached. This diverting device is in the form of a diverting system with two position, which can be very advantageous in itself. The rotating system includes two diverging segments with motorized-roller conveyors mounted about a pivot axis so as to be at an angle of approximately 30 degrees (which angle can be different, depending on the implementations) between the two conveyor segment planes. The greater the angle between the two roller conveyor planes, the faster the positioning speed of the roller conveyors must be for the same pivoting time and vice versa. The pivoting movement can be done with pneumatic cylinders or a rotary motor.

The diverting device can also be a two-position pinching diverter. The pinching system includes two divergent segments of motorized-roller conveyors mounted side by side. Alternatively, the two parts (upper and bottom) of one of the two roller conveyor segments is closed, as the two parts of the other roller conveyor segment open. This diverts the objects to the side where the segment is closed.

After the diverting device, the objects are transported then pivoted so as to arrive in an orientation perpendicular to the initial orientation of the objects at the system to be transferred at right-angle, for instance with reference to an axis substantially in alignment with the initial direction of the shingled stream at the system inlet.

In many implementations, the system includes two transport and indexing sections, namely a right section and a left section. The transport and indexing sections include motorized-roller conveyor segments with an upper pressure-wheel section. Moreover, at least one of the sections includes an extensible conveyor segment which can adjust in length according to the length of the cartons.

In the case of a system with fixed helicoidal inverters, the vertical inversion requires the addition of an inverter section in order to pivot the objects one at a time along the X-axis. A helicoidal inverter device can then be used. It comprises two motor-driven belts. The two belts are disposed so that the objects are held between the two belts and pivoted over 180 degrees as they pass through the inverter section. The helicoidal inverter device is located within the right transport section. The inverter section can also be located within the left transport section.

In other implementations, a dynamic helicoidal section is provided to shift from a position where objects are pivoted of 180 degrees to a position where objects can pass straight through. To achieve this, one of the two ends of the belt is mounted on a rotating frame which allows the upper and bottom pulleys to pivot over 180 degrees and return to the initial position. The frame movements can be driven by a servo-mechanism, pneumatically or in another way, depending on the time required for inversion. The time required from the initial position to the inverted position can be somewhat slow in this case since it is done during set-up. However, in some cases, the inversion may need to be fast because it is done cyclically and must be completed during the time interval in-between two objects.

After the transport, turning and helicoidal inverter sections, objects can be transferred at right-angle and then merged in shingled stream. The transfer at right-angle and the merging are done receiving objects from each of the two transport sections on a belt located 90 degrees from the two transport and turning sections. The cartons fall onto the transfer belt whose speed is calculated so as to move over a given pitch having a predetermined length, for each object forming the shingled stream. Two guides act as stoppers to the objects and the extensible belt is adjusted according to the width of the cartons.

According to one aspect of the concept, there is provided a system for repositioning flat-disposed objects that can be arranged in an overlapping manner at an inlet of the system; the objects having a same initial orientation with reference to one another along a substantially linear and horizontal inlet path, the system including a first lateral deviation conveyor and a second lateral deviation conveyor, each having an inlet located downstream the system inlet and an outlet which is located immediately upstream the system outlet, the first lateral deviation conveyor defining a first deviation path having at least one horizontal and curved segment, and the second lateral deviation conveyor defining a second deviation path having at least one horizontal and curved segment; the outlet of the first lateral deviation conveyor and the outlet of the second lateral deviation conveyor being spaced laterally from one another and located, respectively, on a right side and a left side of a common receiving zone located at the system outlet, the deviation paths having directions, at the two outlets to the lateral deviation conveyors, that are substantially parallel and diametrically opposite to one another; and a diverting device having one inlet and two distinct outlets, one for each lateral deviation conveyor, the diverting device inlet being in registry with the object inlet path and each diverting device outlet being located, one at a time, at a respective position where the outlet is immediately upstream the inlet of the corresponding lateral deviation conveyor, to sequentially create, between the system inlet and the system outlet, a first transport circuit passing through the first deviation path and ending on the right side of the common receiving zone, and a second transport circuit passing through the second deviation path and ending on the left side of the common receiving zone, in order to invert the orientation of the objects transported in the first transport circuit with reference to the objects transported in the second transport circuit.

More details on the different aspects of the proposed concept and the various possible combinations of technical characteristics will become apparent in light of the following detailed description and the corresponding figures.

DETAILED DESCRIPTION

Figure 1:
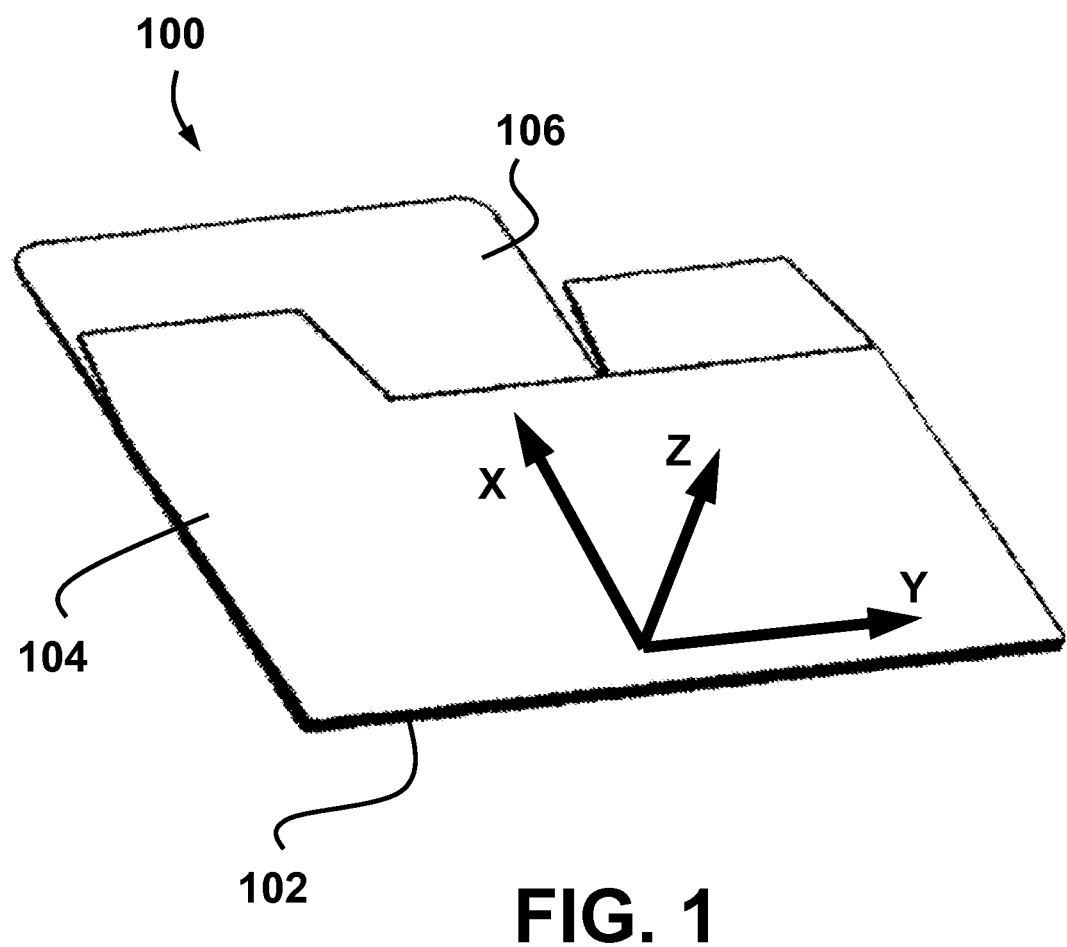
FIG. 1 illustrates an example of a flat-disposed object, in this case a folding carton.

FIG. 1 illustrates an example of a flat-disposed object, in this case a folding carton 100. The carton 100 is just an example amongst a wide range of possibilities. It is therefore important to understand that the flat-disposed objects are not limited to folding cartons since other types of objects could be benefit from the repositioning present in the proposed concept. Such objects could be made of various materials, such as cardboard, compact fiberboard, corrugated cardboard, semi-rigid plastic, microflute cardboard, etc. In addition, the fact that the major part of the following detailed description presents the objects as being cartons, including cartons similar to carton 100 of FIG. 1, is solely for the sake of simplicity.

Carton 100, chosen as example, is representative of an object exiting a folding-gluing machine located upstream in a production line. The carton 100 arrives in a flat configuration, namely the main panels of the carton 100 are folded onto one another, thereby essentially eliminating the internal volume thereof and minimizing the space prior to initial use. The carton 100, in its flat configuration, has a length, a width and a thickness. The length corresponds to the X-axis of the coordinate system shown in FIG. 1, the width corresponds to the Y-axis and the thickness to the Z-axis. The thickness is a significantly smaller dimension than the length and the width. When carton 100 is unfolded for its first use, the X-axis will be oriented vertically upward. Until then, carton 100 will keep its flat configuration. Axes X and Y define the median plane of carton 100. While carton 100 is more or less rectangular, as shown in FIG. 1, one or more of its sides can be non-linear.

Carton 100 chosen as an example also has variable thickness in its flat configuration. Its thickness is greater along its side 102 and diminishes toward the side that is opposite side 102 in the X-axis direction. This variation is caused, for instance by the presence of a base panel folded within the two main panels, namely panel 104 and panel 106, which is located below. Despite the fact that carton 100 (or any other kind of object) has a variable thickness, it is still something that can be characterized as flat in the context. In addition, the use of cartons or any other type of flat-disposed object having a constant thickness (i.e., non-variable) still remains possible.

As needed, the carton 100 can be horizontally inverted, or vertically inverted. Horizontal inversion consists in pivoting the carton over 180 degrees around the Z-axis. The vertical inversion consists in pivoting the carton over 180 degrees around the X- or Y-axis.

Figure 2:
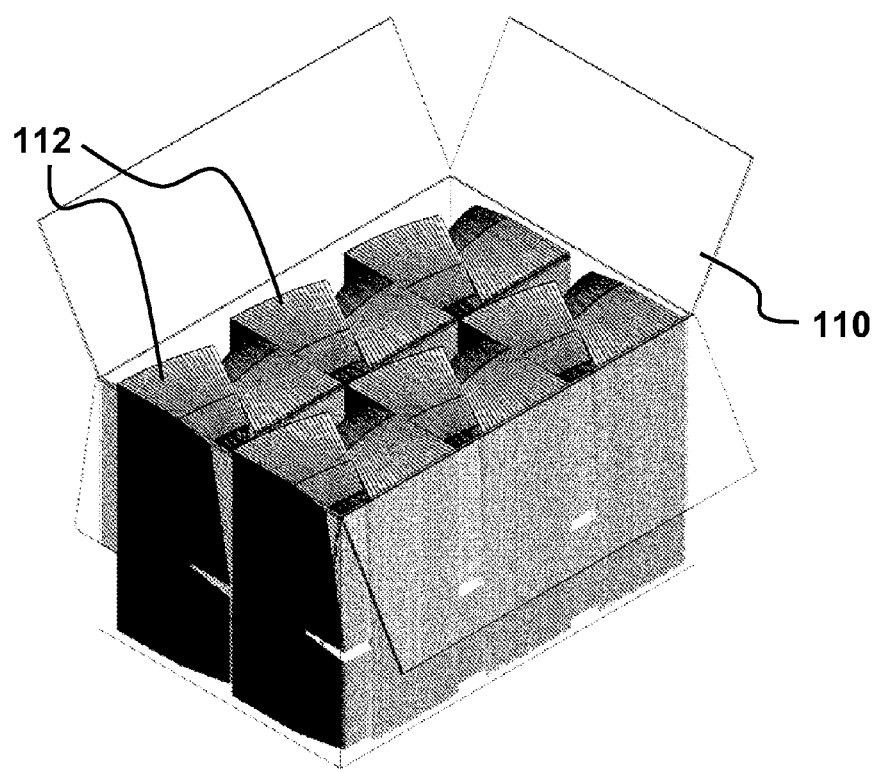
FIG. 2 illustrates an example of a container in which are provided a set of cartons in the form of a plurality of batches.

FIG. 2 illustrates an example of a container 110 in which is located a set of cartons forming several batches 112, each batch 112 containing a predetermined number of stacked cartons, such as cartons like the carton 100 of FIG. 1. The batches 112 are themselves stacked and placed transversally within container 110. In this example, the container 110 is a large box provided for transporting and storing the cartons 100 prior to their first use. These cartons 100, now located in the container 110, came out of the production line. In the illustrated example, each batch 112 contains cartons that are stacked with the same orientation. However, the batches 112 are oriented alternately within the container 110 to compensate for the asymmetric shape of each batch 112 and thereby optimizing the space. The container 110 can then be sent to a factory, a store or any other place where it may be useful to receive such cartons.

Figure 3:
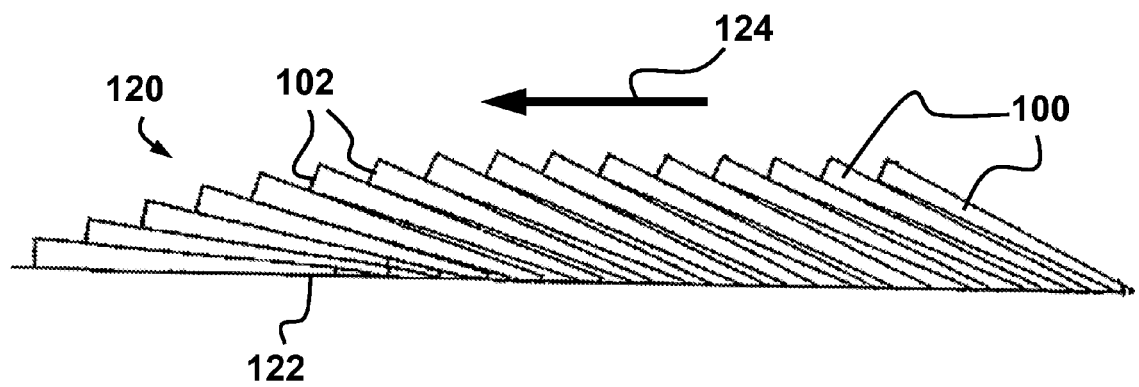
FIG. 3 is a side view semi-schematically illustrating overlapping cartons located upstream where they are to be repositioned.

FIG. 3 is a side view illustrating semi-schematically the overlapping cartons 100 upstream the location they are to be repositioned. In this example, the cartons 100 exit from a folding-gluing machine. The cartons 100 form a shingled stream, called the initial shingled stream 120, and rest on the upper part of a substantially linear and horizontal conveyor 122, in this case a conveyor belt. The cartons 100 are all oriented in the same direction. Only the first carton 100 lies directly on the surface of the conveyor 122, the other cartons 100 being only partially in contact with the surface of the conveyor 122, because they each overlap the previous carton 100.

The initial shingled stream 120 is shown as being discontinuous, namely the last carton 100 of the shingled stream 120 is spaced apart from the next carton (not illustrated). The initial shingled stream can also be continuous, depending on the case. The distance between the overlapping cartons of a shingled stream, in the travel direction, is called the "pitch". The travel direction is depicted by arrow 124. The pitch can be modified if needed.

FIG. 3 also shows the side 102 of each carton 100 having a variable thickness. The thickest side 102 is on the top and perpendicular to the travel direction 124. Each side 102 thus forms the leading transversal side of each carton 100. The thickness of each carton 100 decreases toward the opposite side. This opposite side forms the trailing transversal side. As shown in FIG. 1, the leading transversal side is not necessarily straight and uniform. The same thing applies to the leading transversal side, although, in practice, this edge is often straight and uniform.

Figure 4:
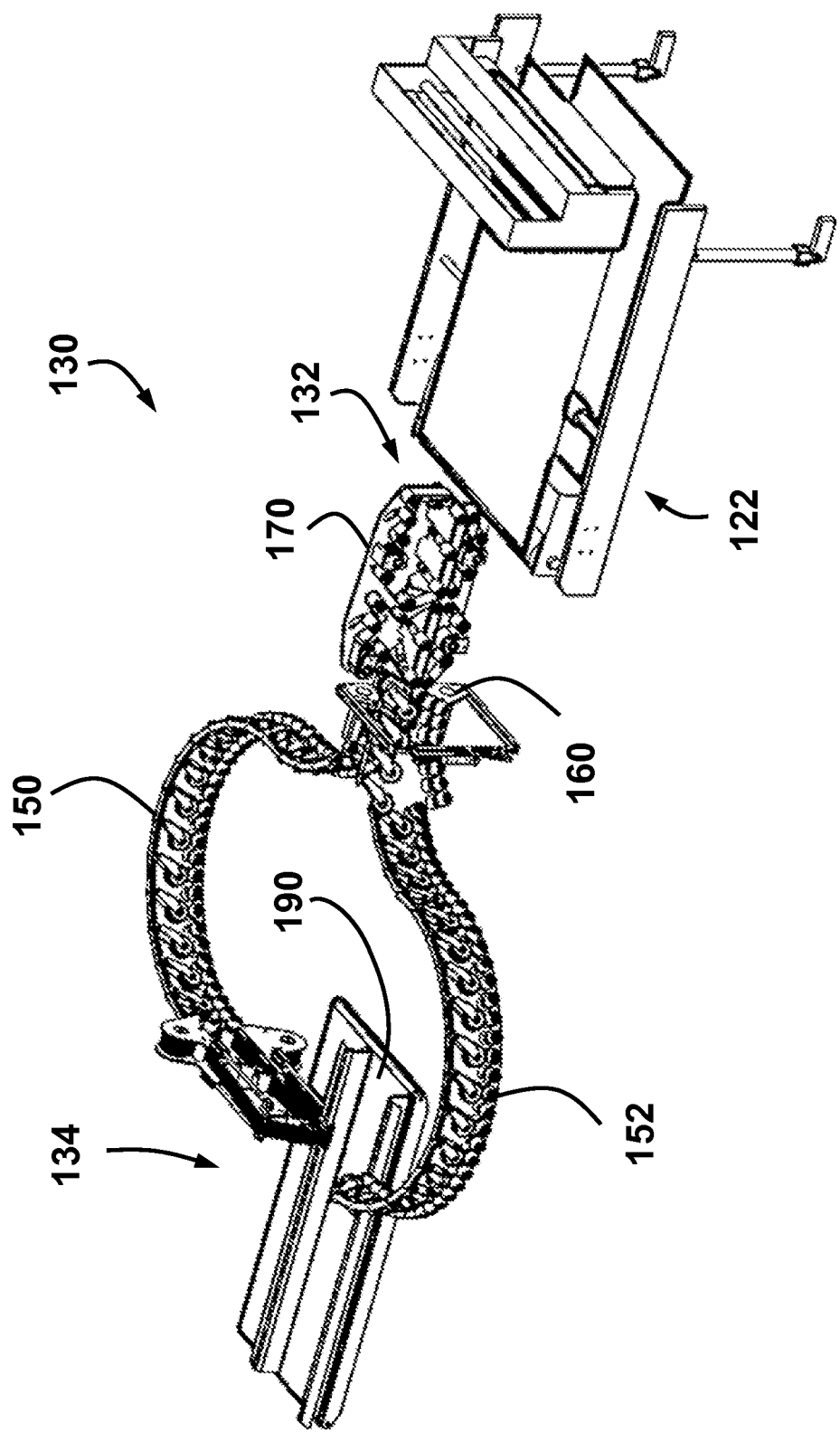
FIG. 4 is an isometric view of an example of a repositioning system incorporating the proposed concept.

FIG. 4 is an isometric view of an example of a repositioning system 130 incorporating the proposed concept. The system 130 includes an inlet 132, and an outlet 134. The inlet 132 is located immediately downstream an inlet conveyor, in this case, the inlet conveyor 122. The outlet 134 of the system 130 is located directly above an outlet conveyor 140. In some implementations, the outlet conveyor 140 could be replaced by a chute or another device.

The system 130 includes a first lateral deviation conveyor 150 and a second lateral deviation conveyor 152. In this case, the first lateral deviation conveyor 150 is located to the right of the carton inlet path and the second lateral deviation conveyor 152 is located to the left. Each of the two lateral deviation conveyors, 150, 152 has an inlet located downstream the inlet 132 of the system 130 and an outlet located immediately upstream the outlet 134 of the system 130.

The system 130 also includes a diverting device 160, having one inlet and two distinct outlets, one for each lateral deviation conveyor 150, 152. The inlet of the diverting device 160 is in registry with the carton inlet path and each outlet of the diverting device 160 is located, separately, at a respective position where its exit is immediately upstream the corresponding lateral deviation conveyor 150, 152. The diverting device 160 is thus located immediately upstream the two lateral deviation conveyors 150, 152.

The system 130 in the illustrated example also includes a shingled stream separation device 170. This separation device 170 is located immediately at the inlet 132 of the system 130 and downstream the inlet of the diverting device 160. The main role of the diverting device 170 is to create a space to discontinue the initial shingled stream 120 (FIG. 3). This spacing will allow the diverting device 160 moving into a different position as soon as the end of the previous shingled stream has passed over one of the two lateral deviation conveyors 150, 152.

It is important to note that in some implementations, the initial shingled stream 120 could be discontinued, and already provided with the necessary spacing. In this case, the separation device 170 may not be required.

Figure 5:
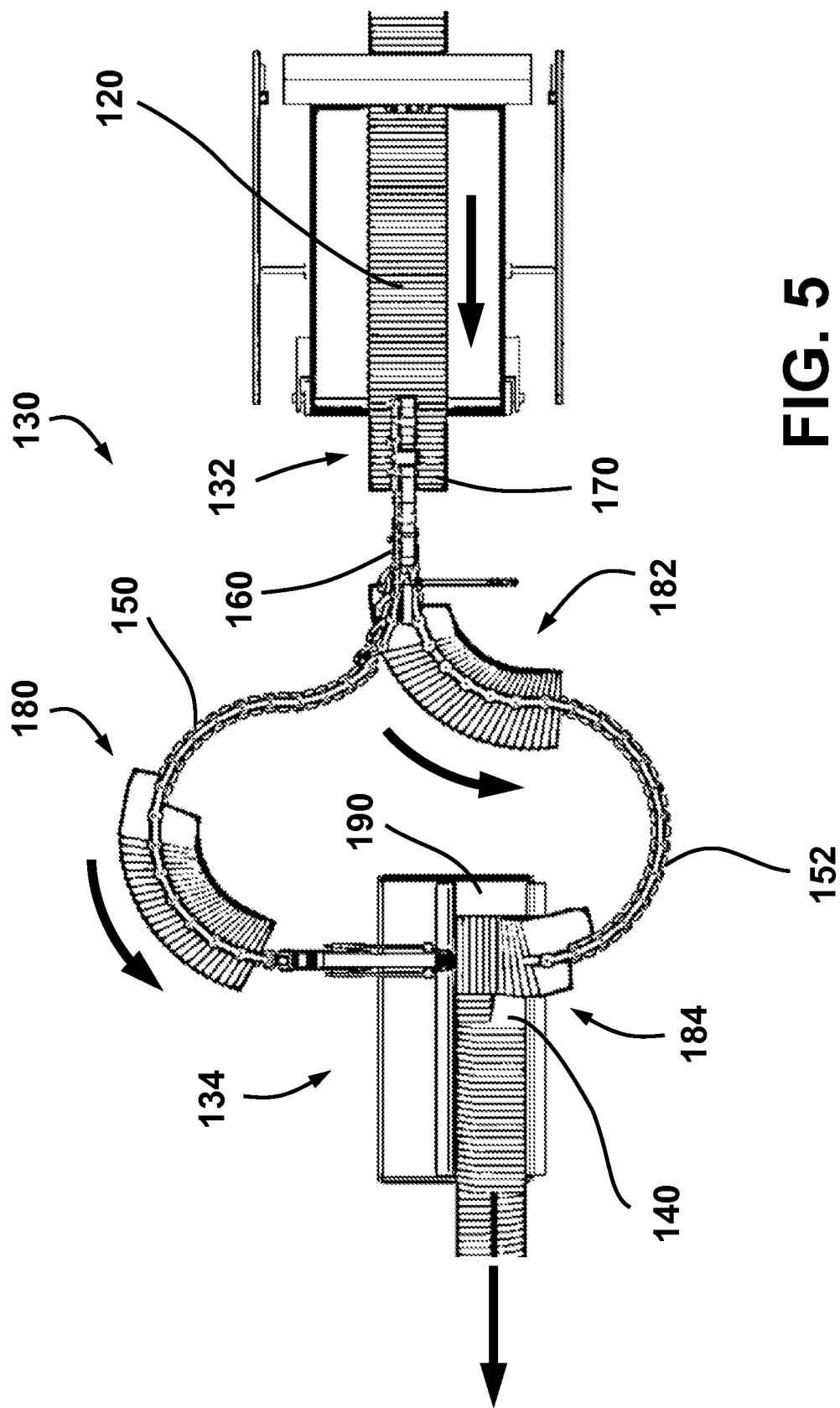
FIG. 5 is a top view of the system shown in FIG. 4.

FIG. 5 is a top view of the system 130 shown in FIG. 4. The system 130 is shown in use. The initial shingled stream 120 can be seen as transit shingled streams 180, 182, 184 travelling along the two lateral deviation conveyors 150, 152. The cartons in the transit shingled streams 180, 182, 184 are then recombined at the outlet 134 of the system 130 in a common receiving zone 190. This common receiving zone 190 is located immediately above the outlet conveyor 140 in the example.

The first lateral deviation conveyor 150 defines a first deviation path having at least one curved horizontal segment. The second lateral deviation conveyor 152 defines a second deviation path having at least one curved horizontal segment. In the example, the two deviation paths are in the horizontal plane. The cartons 100 are then guided and supported, both above and below. The median plane of each carton 100 remains approximately the same throughout the path. This means that no carton is subjected to any bending, which is very advantageous when handling flat-disposed objects that are made of an inflexible material.

Figure 6:
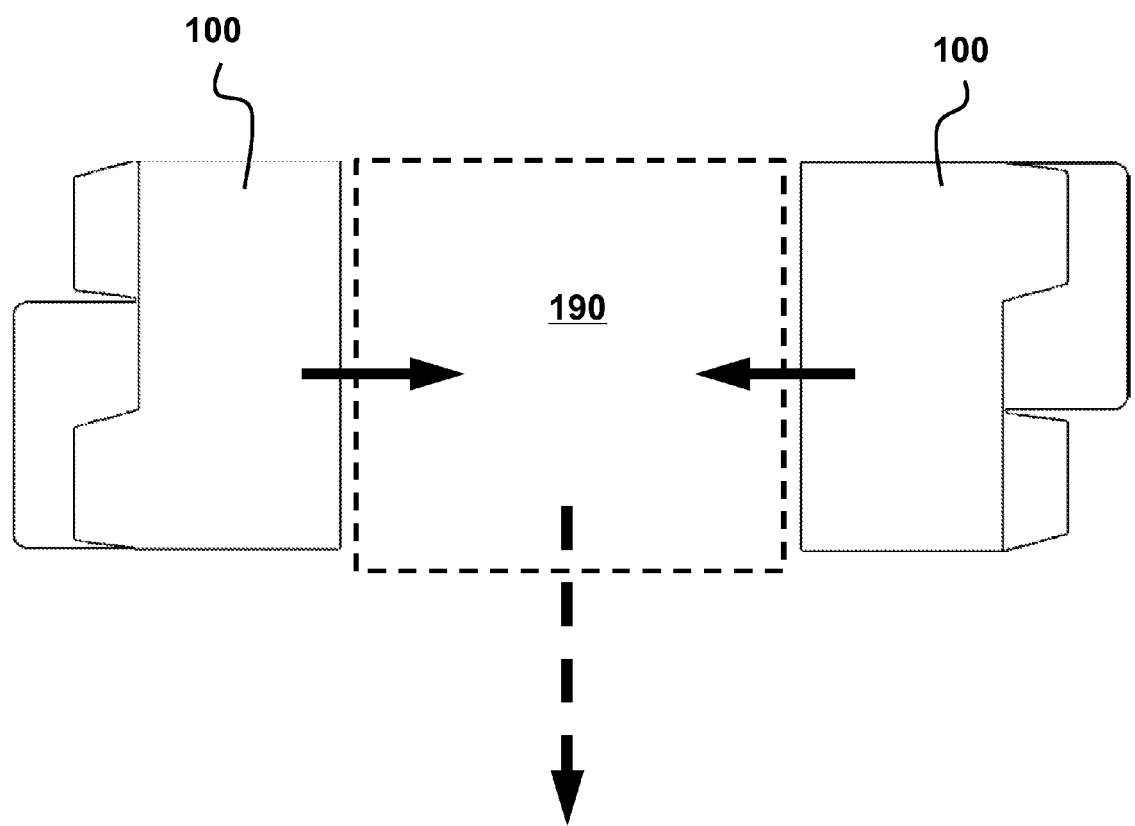
FIG. 6 is a semi-schematic view of the common receiving zone of the system in FIG. 4.

FIG. 6 is a semi-schematic view of the common receiving zone 190 of the system 130 shown in FIG. 4. As can be seen, at the outlets of the lateral deviation conveyors 150, 152, the two deviation paths have directions that are substantially parallel and diametrically opposite to one another. The outlet of the first lateral deviation conveyor 150 is located on the right side of the common receiving zone 190. The outlet of the second lateral deviation conveyor 152 is located on the left side of the common receiving zone 190.

It should be noted that in FIG. 6, the cartons 100 are shown as being admitted into the common receiving zone 190 from both sides at the same time. However, FIG. 6 is just an explanatory view and when the system 130 is operating, the cartons 100 are only accepted from one side at a time in order to prevent collision between the cartons 100. As is shown in FIG. 5, the cartons 100 from one transit shingled stream are set one at a time on the outlet conveyor 140 in order to create an outlet shingled stream having laterally-overlapping cartons. The first of the cartons 100 of the transit shingled stream 180 will arrive after the last carton from the transit shingled stream 184.

The diverting device 160 located immediately upstream the inlet of lateral deviation conveyors 150, 152 sequentially creates, between the inlet 132 and the outlet 134 of the system 130, a first transport circuit passing through the first deviation path and ending on the right side of the common receiving zone 190, and a second transport circuit passing through the second deviation path and ending on the left side of the common receiving zone 190. Thus, the system 130 can invert the orientation of the cartons 100 transported in the first transport circuit with reference to the cartons 100 transported in the second transport circuit. These cartons 100 then have an orientation inverted by 180 degrees, depending on whether they went through the right or the left. Their travel direction is also pivoted by 90 degrees because the side 102 of each carton 100 (the side which was the leading transversal edge in the initial shingled stream 120) is now located on what is the right or left longitudinal edge with reference to the outlet path.

FIG. 4 shows that throughout the length of the two transport circuits within the system 130, the cartons 100 are always supported above and below. This means that the cartons 100 can be guided at all points. The guidance is done by rollers and belts, depending on the location.

Figure 7:
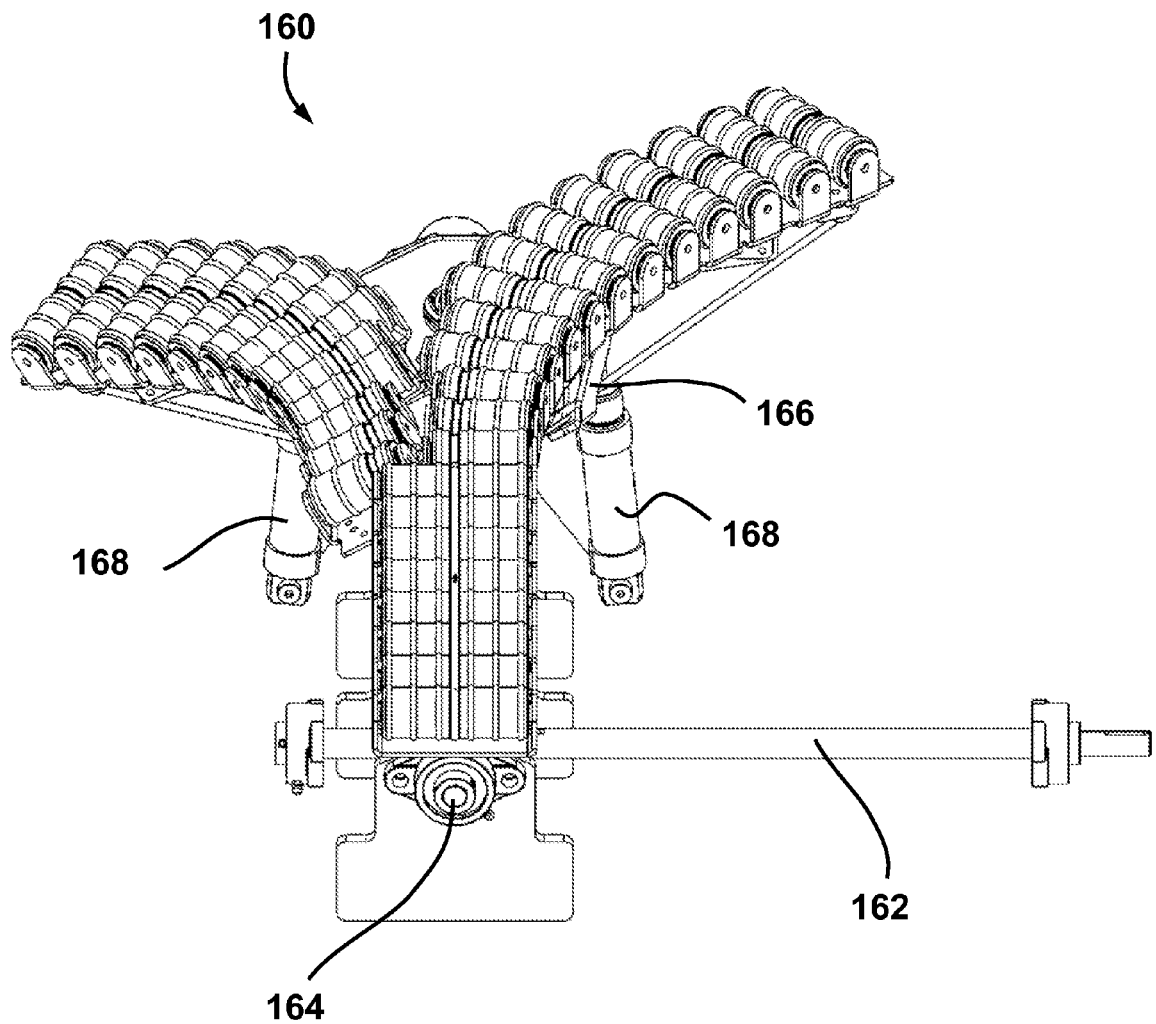
FIG. 7 is an isometric view of the bottom part of the diverting device of the system in FIG. 4.

FIG. 7 is an isometric view of the bottom part of the diverting device 160 of the system 130 in FIG. 4. The diverting device 160 is illustrated in a first position. It should be noted that the upper part is not shown for the sake of simplicity. However, this upper part is shown in other figures.

The first position of the diverting device 160 corresponds to the one in which the cartons 100 of the initial shingled stream 120 are directed to the right in the example. The inlet path of the cartons, which was initially linear, is subject to an inflection point toward the right. In the example, as previously indicated, the first deviation path is in the horizontal plane.

The bottom part of the diverting device 160 of the system 130 includes a series of rollers for which the rotation axis is transversally-disposed with reference to the inlet path of the cartons 100. The axes of these rollers are parallel along a certain distance from the inlet point of the diverting device 160. Subsequently, only the halves on the right of some rollers are in position. The halves on the left are temporarily positioned further down. The rotation axes of the right halves are shifted at an angle to create the inflection point toward the right. Moreover, when the path is clearly tangential to the inlet path, the rollers returned to their full width and the diverting device 160 ends in what is called the right outlet. This right-side outlet is then aligned with the inlet of the lateral deviation conveyor 150, which is to the right. Most of the length of this conveyor is constructed similarly.

FIG. 7 shows the drive shaft 162 provided to transfer the torque to the rollers. The drive shaft 162 is driven by a motor (not shown). The main pivot axis 164 of the movable frame 166, on which the rollers are mounted, can also be seen. This frame 166 pivots around the pivot axis 164 to shift from the first position to the second position, and vice versa. The second position is one in which the diverting device 160 guides the cartons 100 to a transit shingled stream on the left. In the example, the cylinders 168 are provided to pivot the mobile frame 166 with reference to a fixed base. The rightward rollers and the leftward rollers are mounted on the same mobile frame 166.

Figure 8:
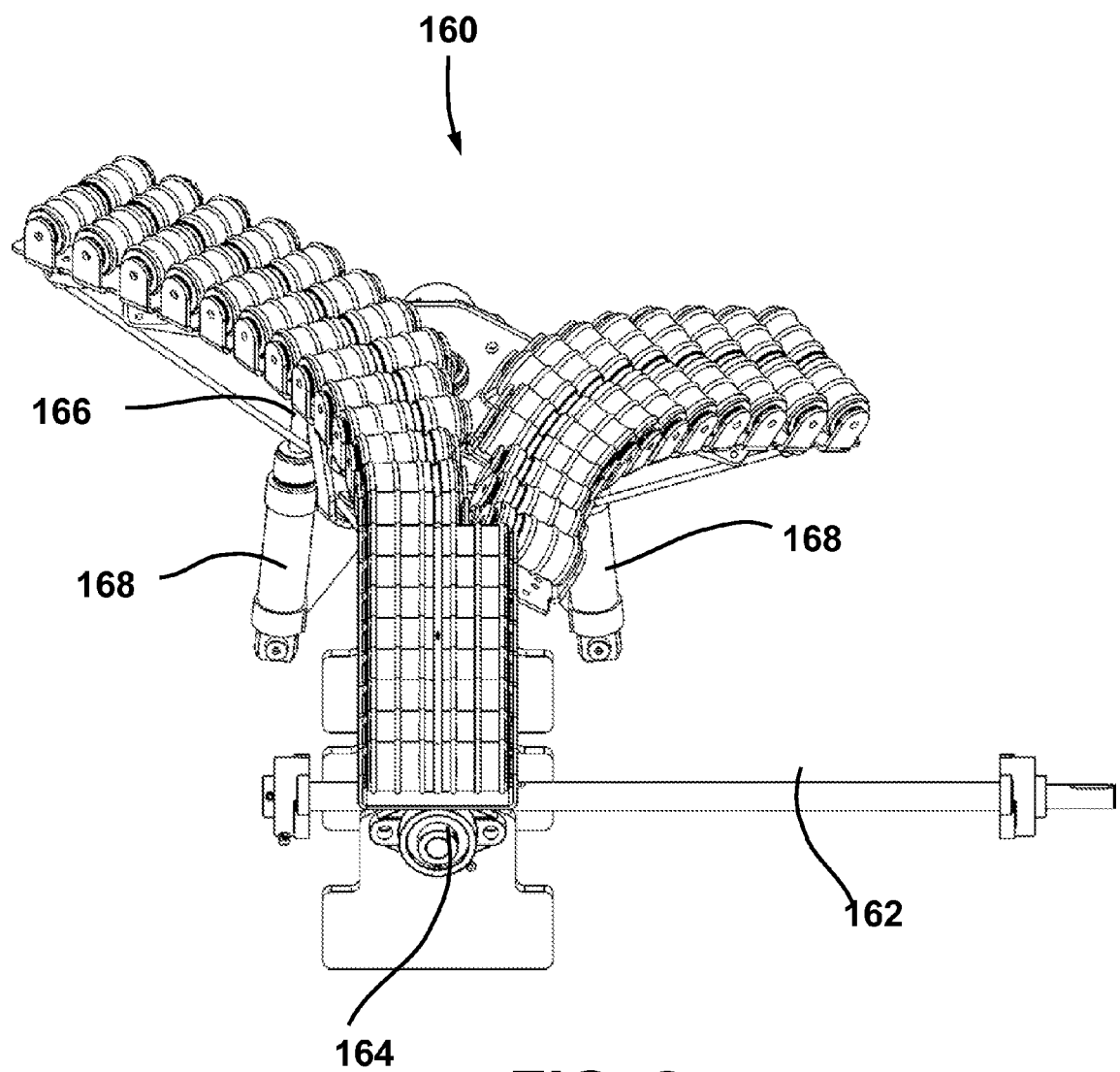
FIG. 8 is an isometric view of the bottom part of the diverting device of the system in FIG. 4, which diverting device is shown in its second position.

FIG. 8 is an isometric view of the bottom part of the diverting device 160 of the system 130 in FIG. 4. The diverting device 160 is illustrated in the second position. This view is similar that of FIG. 7, with the exception of the position. The upper part of the diverting device 160 was pivoted to locate the rollers over the cartons 100 to ensure optimal guiding, particularly within the curves.

Figure 9:
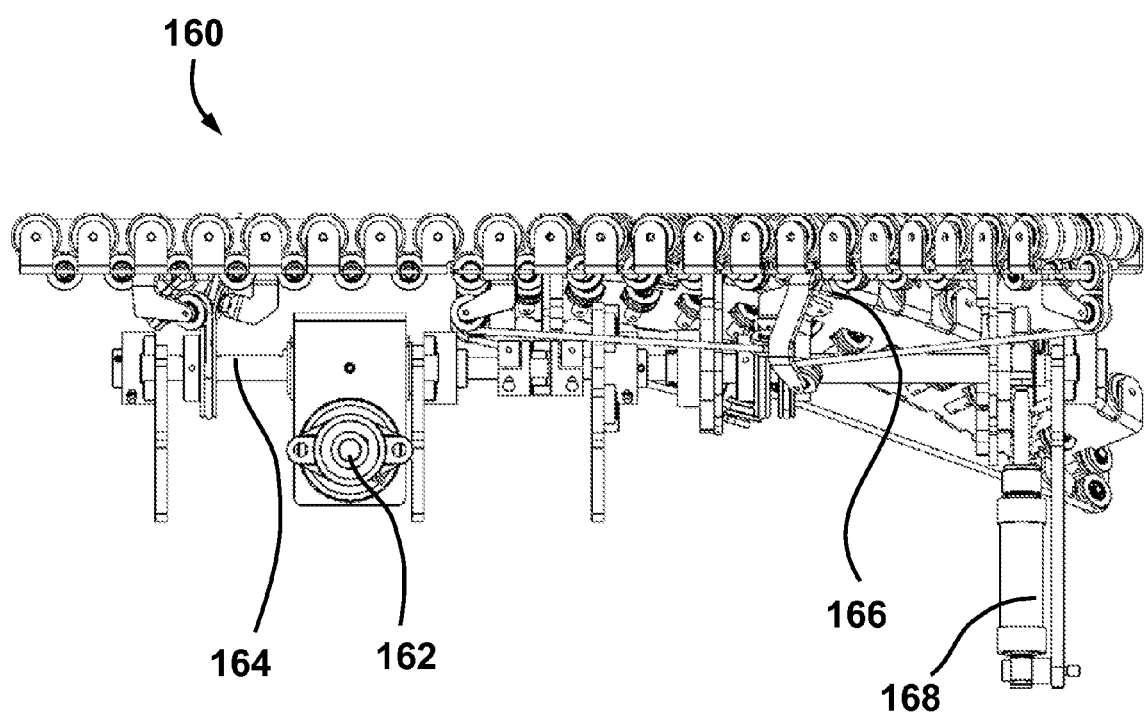
FIG. 9 is an elevation view showing the lateral side of the bottom part of the diverting device in FIG. 7.

FIG. 9 is an elevation view showing the lateral side of the bottom part of the diverting device 160 in FIG. 7.

Figure 10:
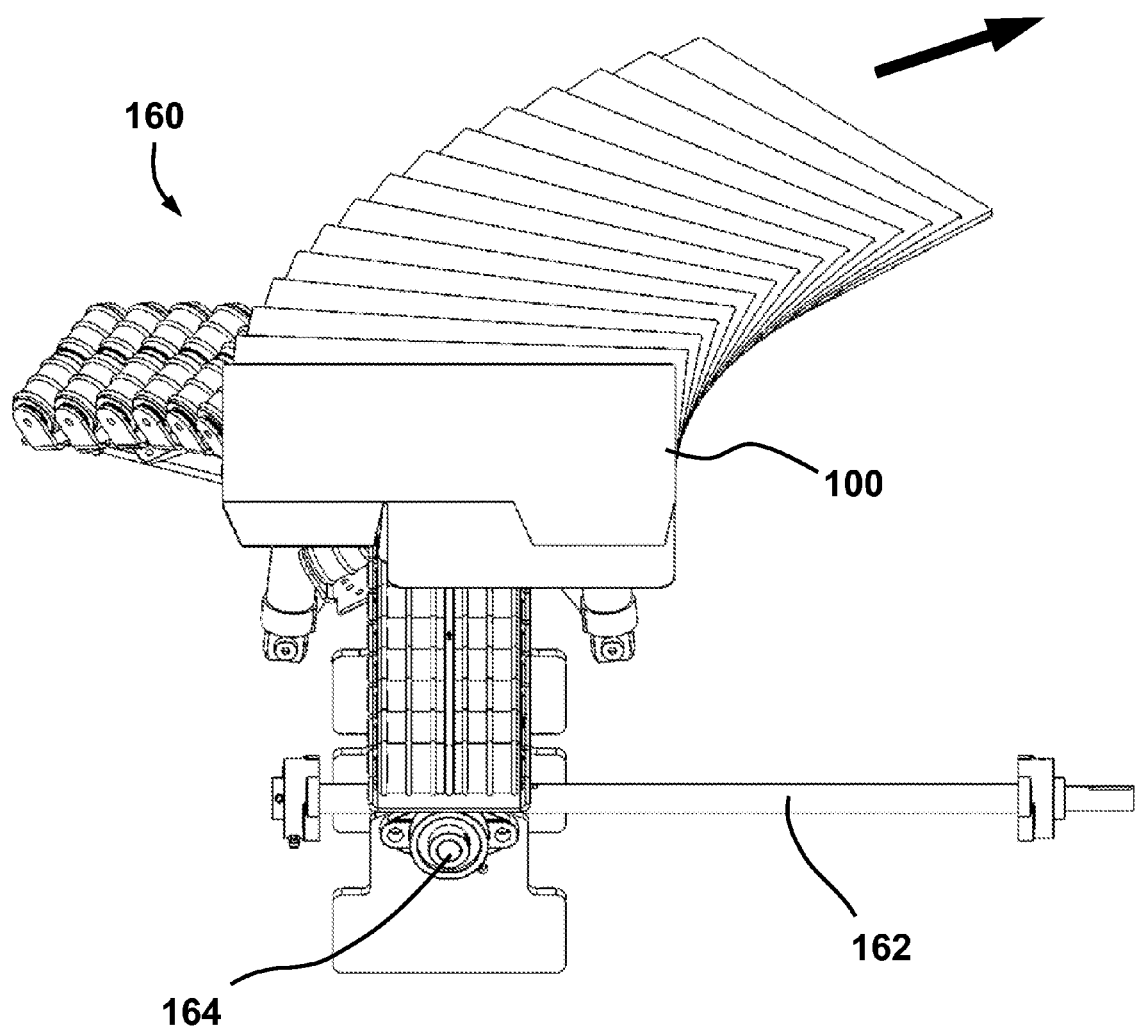
FIG. 10 is a view similar to FIG. 7 but with an example of a shingled stream of cartons being sent toward the right side.
Figure 11:
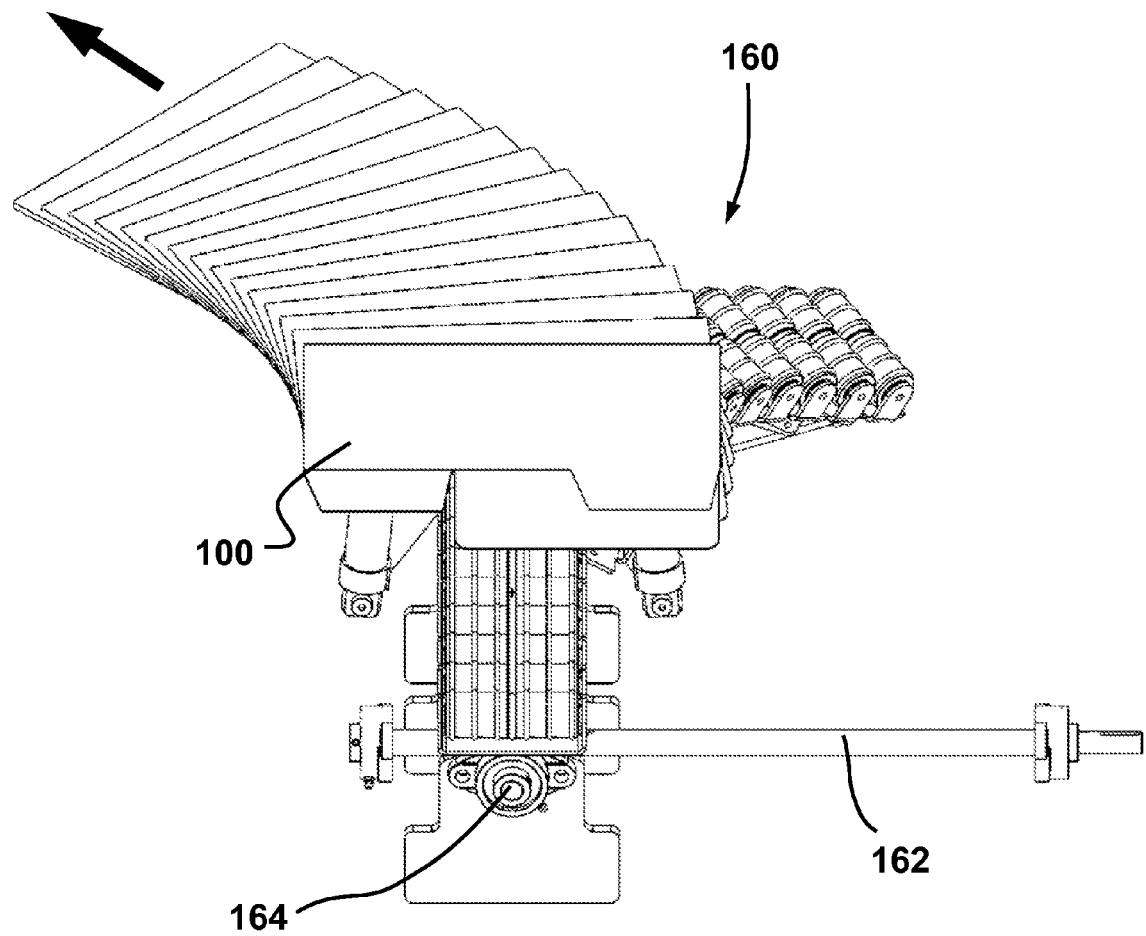
FIG. 11 is a view similar to FIG. 10 but with an example of a shingled stream of cartons being sent toward the left side.

FIG. 10 is a view similar to FIG. 7 but with an example of a shingled stream of cartons 100 being sent toward the right. FIG. 11 shows the cartons 100 pivoting to the right to move toward the lateral deviation conveyor 150 on the right. The cartons 100 are pivoted around the Z-axis (FIG. 1). With the exception of the carton at the head of the transit shingled streams, each carton 100 turns onto the preceding carton. The cartons 100 are not bent. They remain in position by friction from the rollers, as well as from the downward pressure exerted by the upper rollers. The bottom rollers are driven in rotation along the length of the circuit and synchronized, which maintains the pitch between the cartons 100 in a same transit shingled stream.

FIG. 11 is a view similar to FIG. 10 but with an example of a shingled stream of cartons 100 being sent toward the left side.

Figure 12:
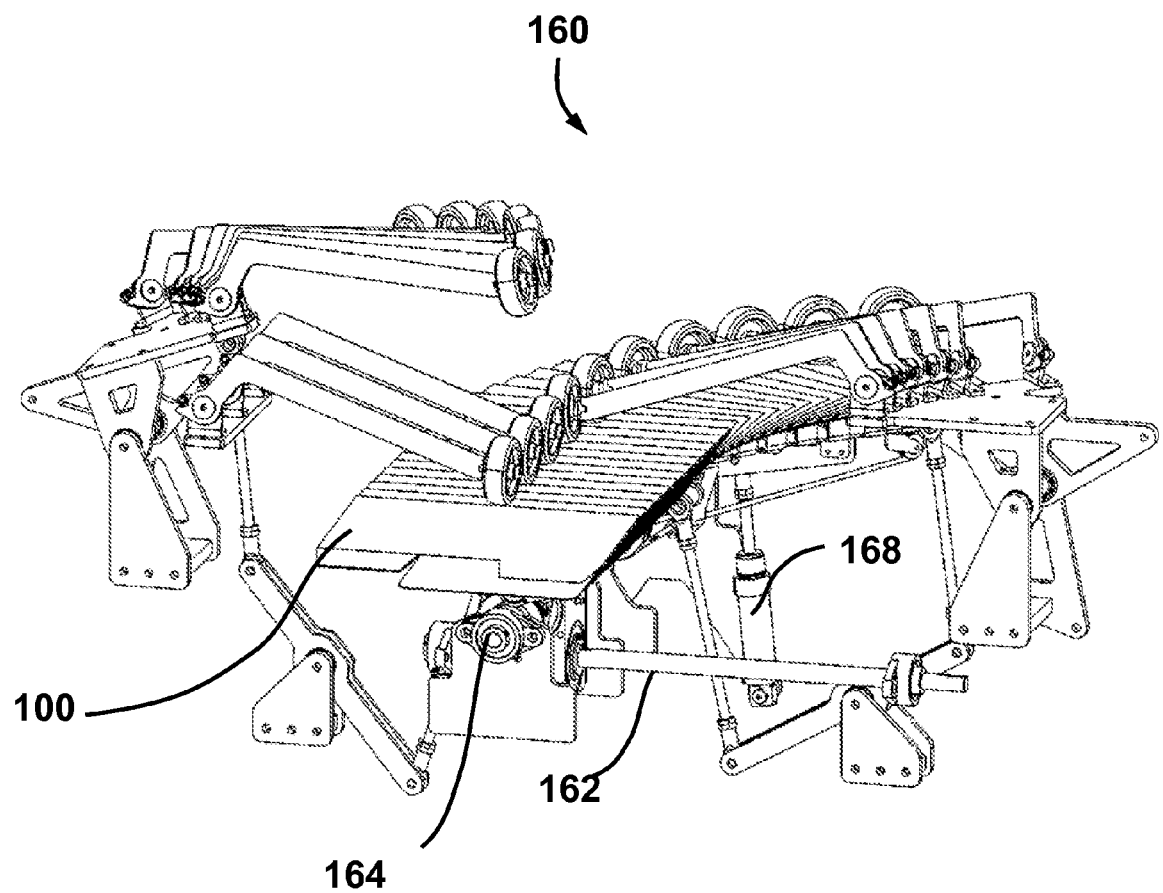
FIG. 12 is an isometric view similar to FIG. 10 but also with the upper part of the diverting device.

FIG. 12 is an isometric view similar to FIG. 10, but also showing the upper part of the diverting device 160. FIG. 12 shows the different linkage mechanisms between the bottom and upper parts of the diverting device 160.

Figure 13:
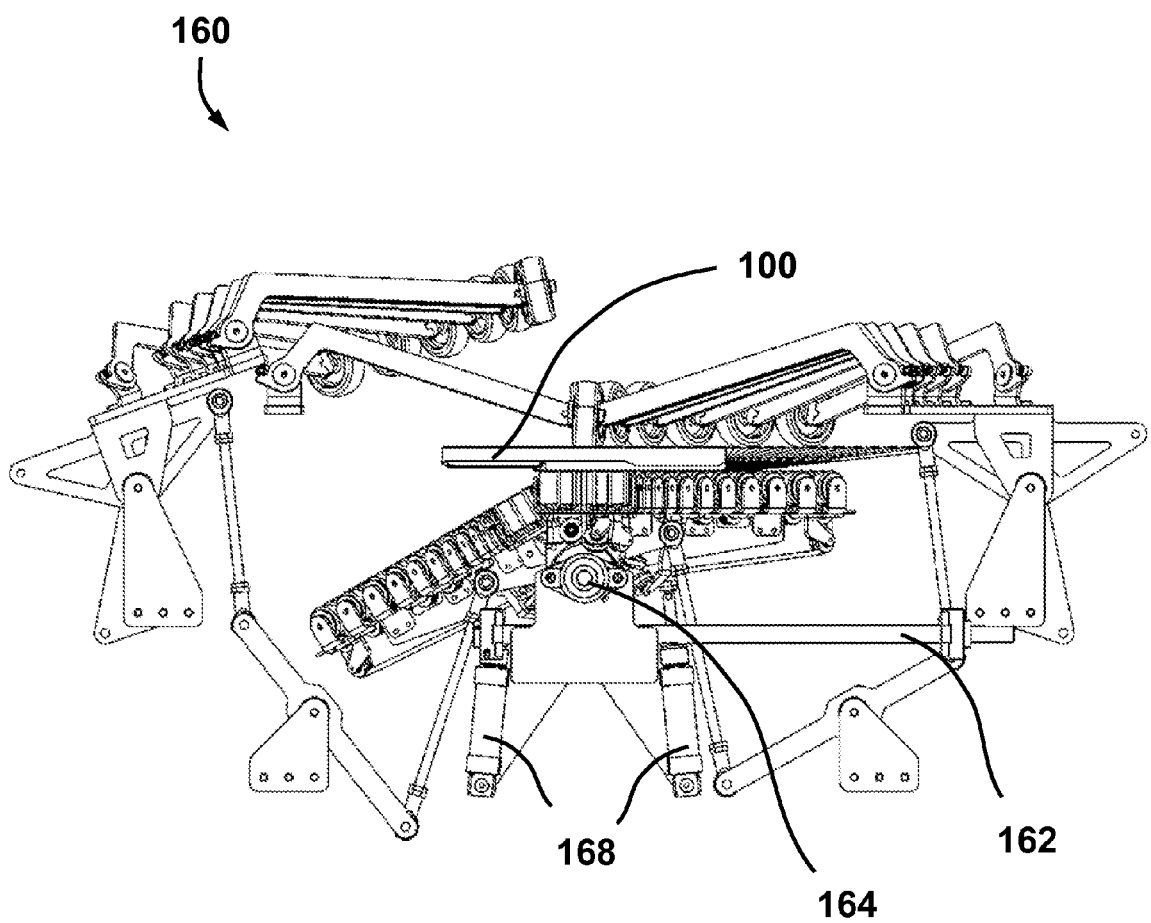
FIG. 13 is an elevation view showing the end of the diverting device in FIG. 12.

FIG. 13 is an elevation view showing the end of the diverting device 160 in FIG. 12.

Figure 14:
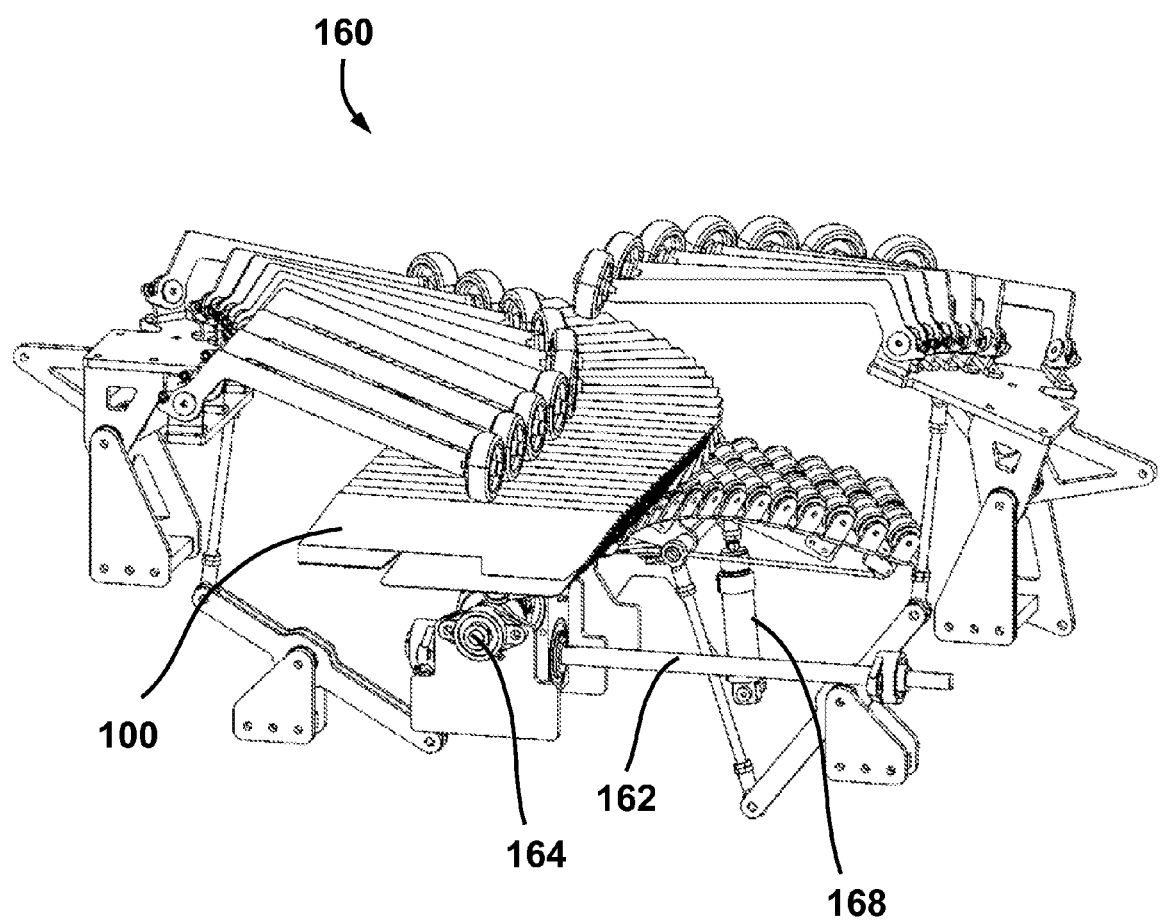
FIG. 14 is an isometric view similar to FIG. 11 but with the upper part of the diverting device.

FIG. 14 is an isometric view similar to FIG. 11 but with the upper part of the diverting device 160.

Figure 15:
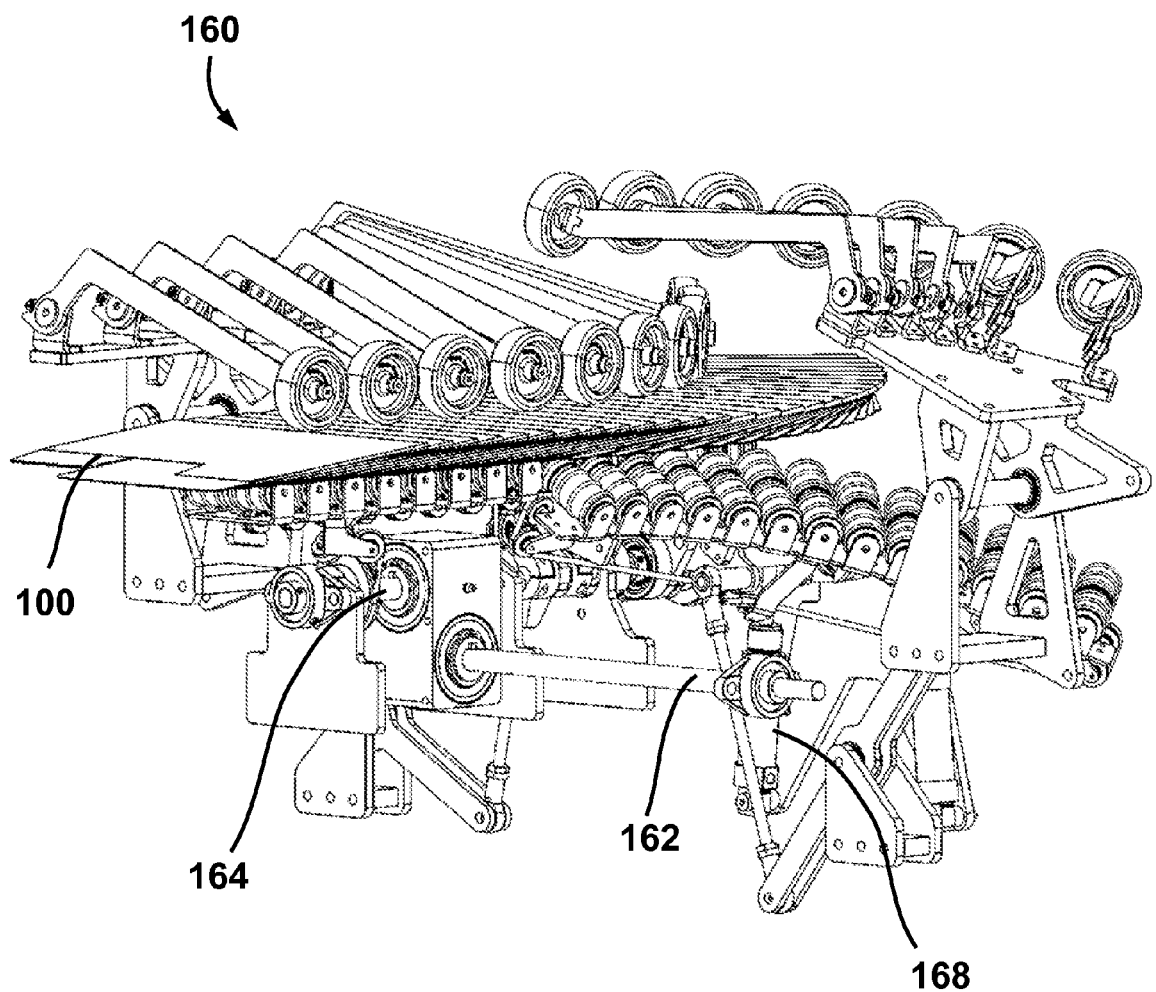
FIG. 15 is a view similar to FIG. 14, but shown from a different angle.

FIG. 15 is a view similar to FIG. 14 but shown from a different angle.

Figure 16:
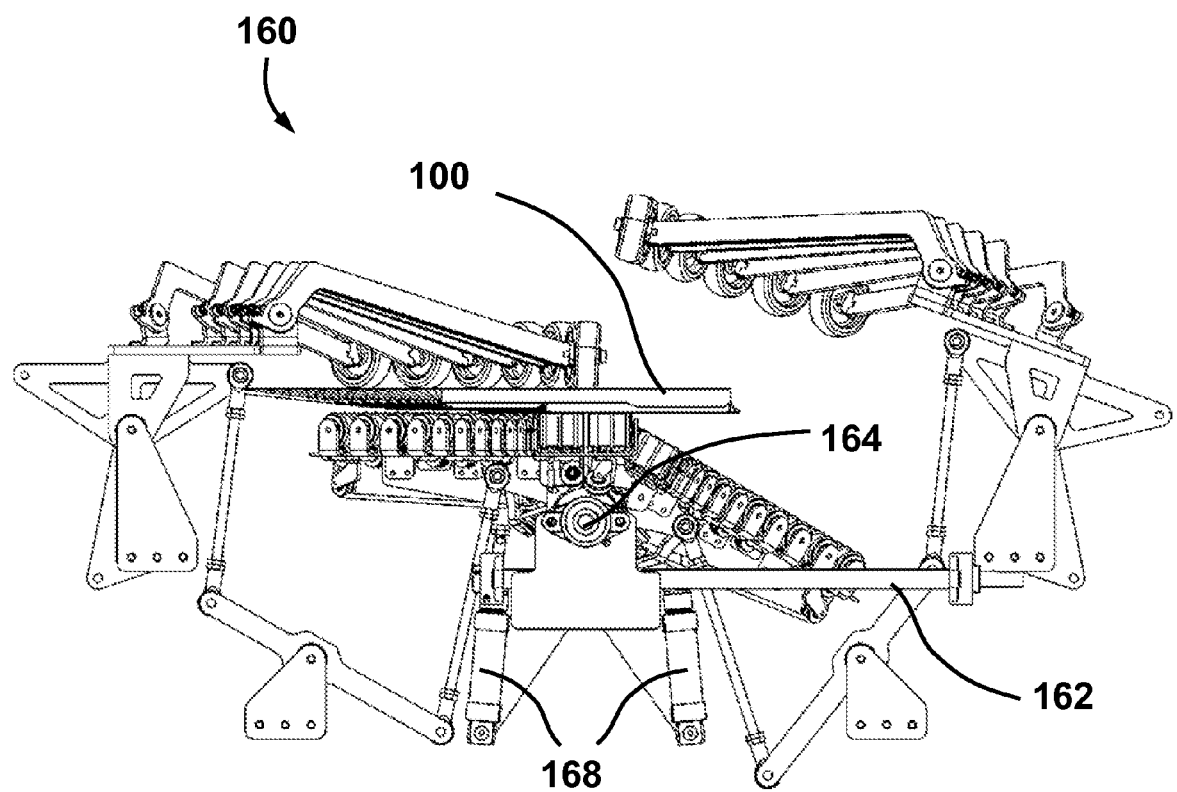
FIG. 16 is an elevation view showing the end of the diverting device in FIG. 14.

FIG. 16 is an elevation view showing the end of the diverting device 160 in FIG. 14.

Figure 17:
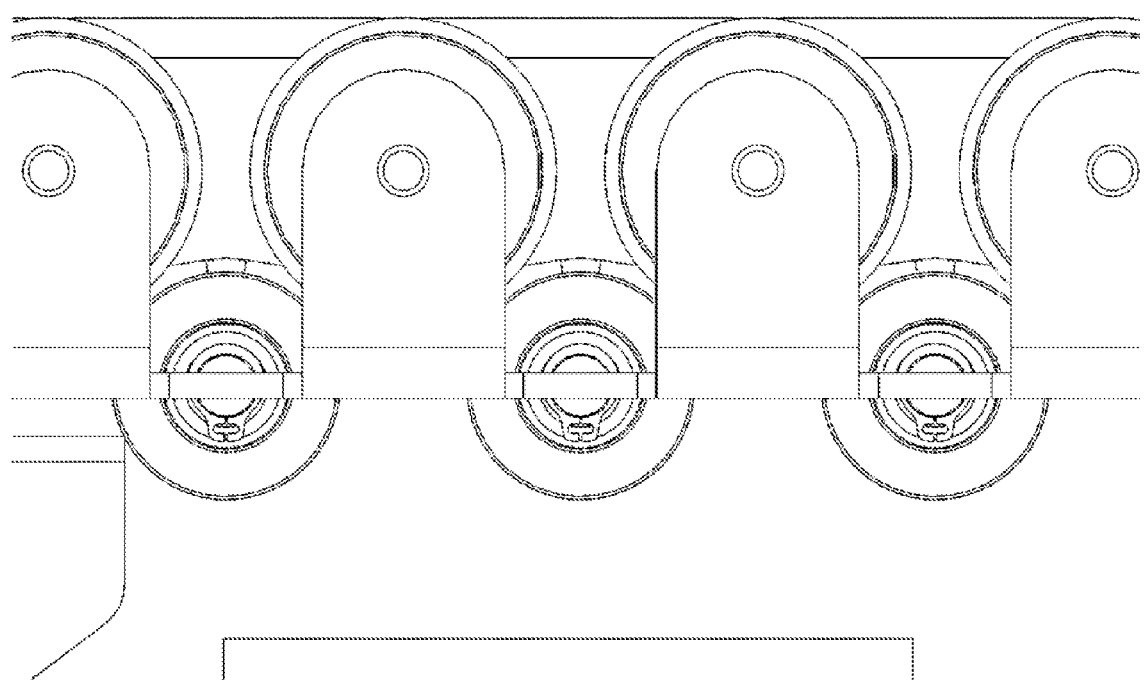
FIG. 17 is an elevation view showing an example of a configuration to drive the rollers.

FIG. 17 is an elevation view showing an example of a configuration to drive the rollers. This view is for instance an enlarged illustration of the bottom part at the inlet of the diverting device 160. The rollers can be driven by a belt with a circular cross section that zigzags alternatively between the upper surface of the rollers and the bottom surface of the intermediate wheels. This arrangement may be similar, for example, to that presented in document EP 1 832 531, which is incorporated by reference to the present application.

Figure 18:
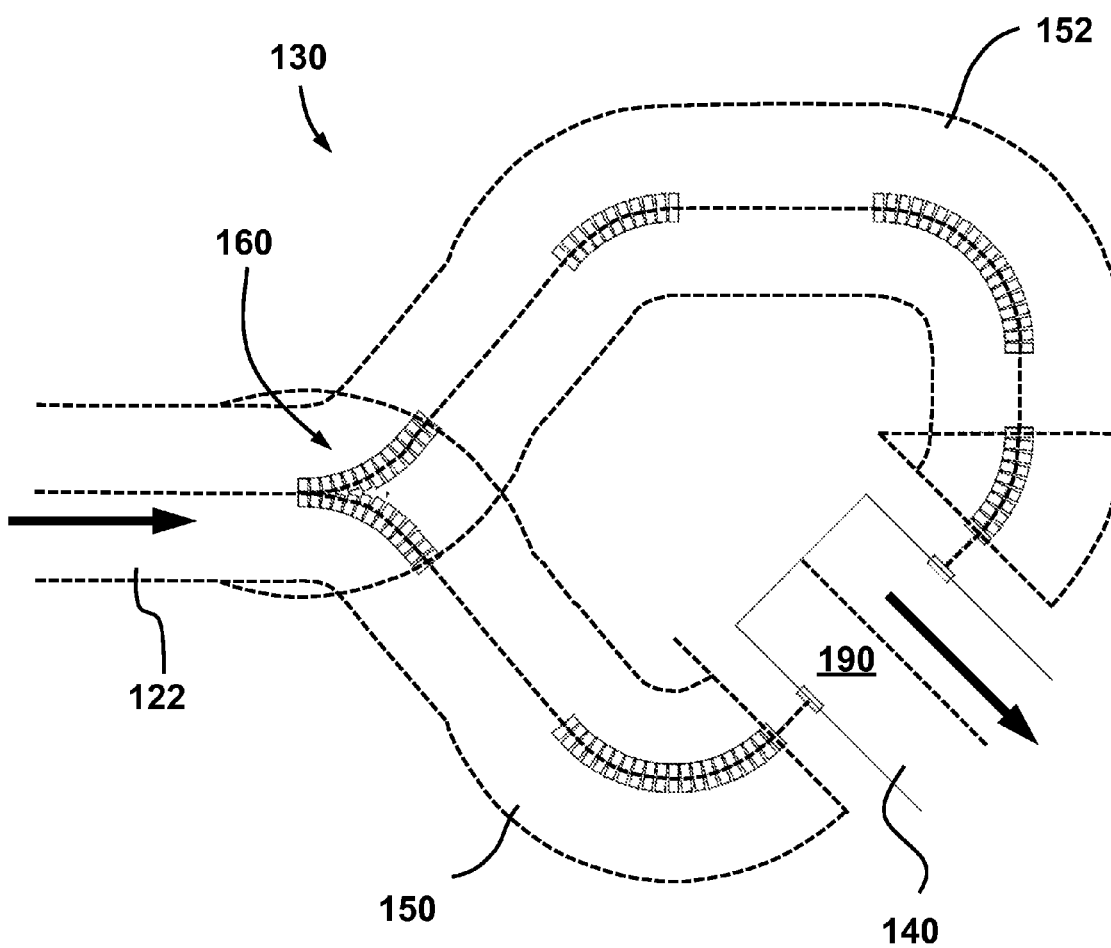
FIG. 18 is a semi-schematic top view showing a system configuration in which the outlet path of the cartons is not parallel to the inlet path.

FIG. 18 is a semi-schematic top view showing a configuration of the system 130 in which the carton path at the outlet 134 of the system 130 is neither aligned, nor even parallel to the inlet path. The first lateral deviation conveyor 150 is therefore shorter than the second in this example. It is also possible for this variation in length to then be compensated for by modifying the travel speed of the transit shingled streams. Other implementations are also possible. The illustrated example in FIG. 18 is a good illustration of the flexibility provided by the system 130. As a result, it will no longer be necessary to have the outlet path parallel to the inlet path. However, the cartons 100 will still become inverted at the outlet of the system 130. The sum of the pivoting angle of the cartons 100 passing through the first transport circuit and the pivoting angle of the cartons 100 passing through the second circuit will be 180 degrees.

Figure 19:
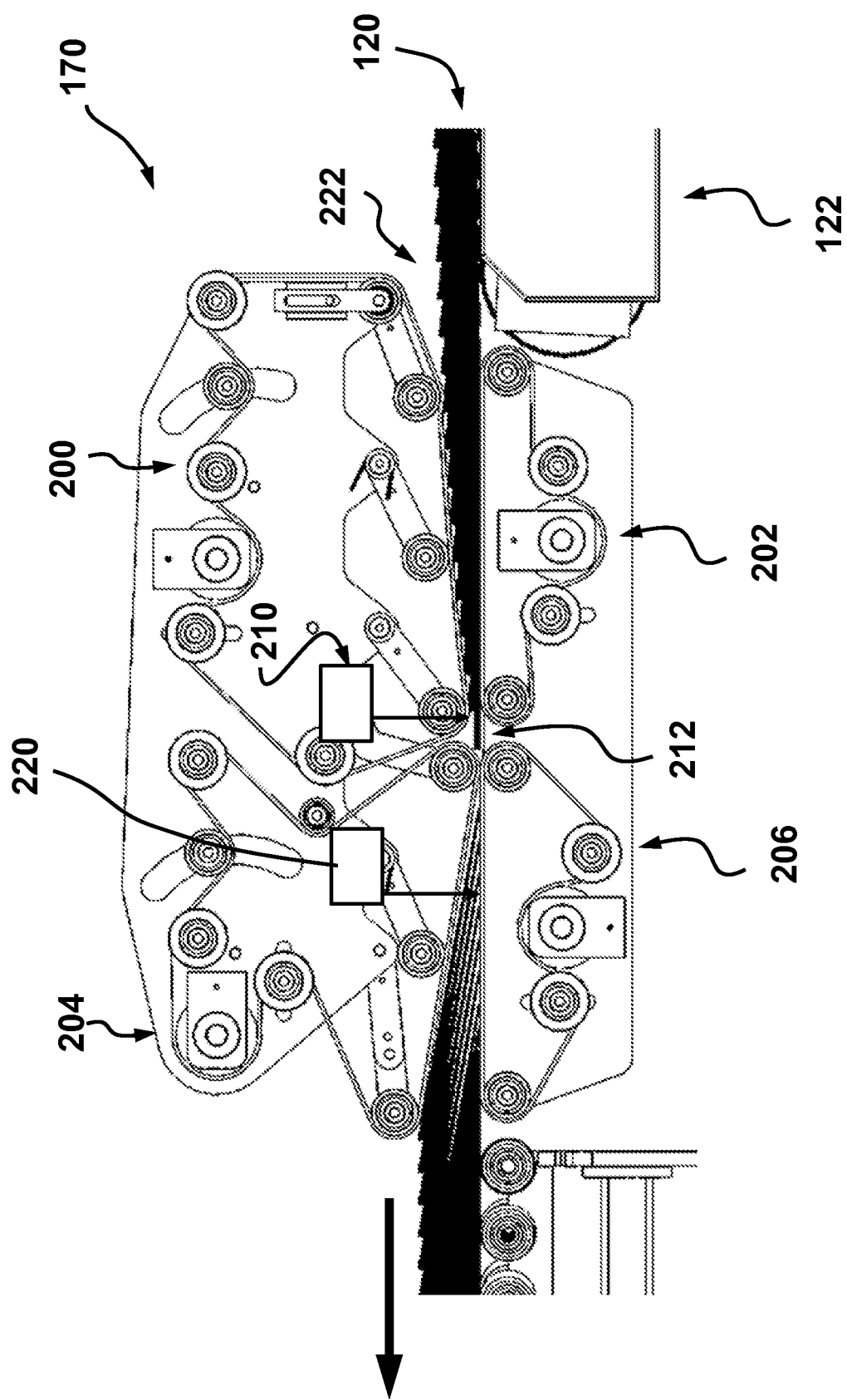
FIG. 19 is an elevation view showing the left side of the shingled stream separation device used in the system of FIG. 4.

FIG. 19 is an elevation view showing the left side of the separation device 170 of the system 130 in FIG. 4. This separation device 170 includes an inlet section and an outlet section, each having a corresponding bottom and upper belt. The belts in the inlet section operate at a variable speed in order to feed the cartons 100 in the direction of the outlet section. The belts in the outlet section also operate at a variable speed, but with a higher maximum speed.

The belt motorization must be capable of providing a rapid acceleration and deceleration during the separation phases. The top speed during acceleration is generally about 5 to 8 times the speed at the inlet conveyor 122 and typically must be reached between 100 and 200 m/s. This motorization is often done with the help of servo-motors. Other implementations are also possible. The separation device 170 creates transit shingled streams with spacing between them. This spacing gives time for the diverting device 160 to move between the two positions, for instance by using one or more cylinders which operate the bottom part and upper part at the same time. The pivoting stroke is designed to be as short as possible for the maximum reduction of time necessary to shift between the two positions. Moreover, only one part downstream the inlet of the diverting device 160 is moved because the two circuits have a common inlet point in the example illustrated. It is then possible to begin accepting a transit shingled stream, even if the pivoting of the mobile frame 166 has not ended. This results in a faster change of orientation and an increased top speed because it can be ready before the cartons 100 have entered therein.

The separation device 170 is formed by an inlet section with the upper belt 200 and the bottom belt 202, and by an outlet section with the upper belt 204 and the bottom belt 206. The inlet and outlet are driven by an independent motorization. The upper belts 200, 204 and the bottom belts 202, 206 of each section are preferably mechanically connected. A carton-counting sensor 210 is located upstream the separation zone 212.

The pulleys supporting the upper belts 200, 204 in their portion located directly above the cartons are mounted around the pivoting arms to allow changes in the height of the initial shingled stream 120 to be followed. The arms are also designed to exercise a downward force, for instance using collaborated springs or adjustable pressure cylinders. The forces are sufficient to hold the cartons without damaging them. The forces are generally greater in the outlet section. The upper belts 200, 204 are also supported by pulleys with a tension mechanism to compensate for length variations in operation. In addition, the first pulley of the inlet belt 200, which is located directly above the inlet zone of the separation device 170 illustrated in FIG. 19, is adjustable in height to control the carton accumulation tendency by distributing the pitch reduction between the cartons among a plurality of successive cartons. This prevents some cartons from completely overlapping others. The pulley height can be adjusted as a function of the height of the initial shingled stream 120.

The separation sequence begins by a process in which the inlet belts, 200, 202 move at the same speed as the outlet belts 204, 206. Typically, this speed is the same as the inlet speed of the initial shingled stream 120 on the inlet conveyor 122. The speed can be adjusted to become faster or slower than that of the inlet conveyor 122 in order to increase or reduce the pitch of the initial shingled stream 120 and facilitate its separation into batches or for counting. The optimal pitch is often 25 mm or greater. The faster the pitch, the less the separation. The distance between the counter 210 and the separation zone 212 can influence the counting of the cartons 100. The software provided to control the separation device 170 can compensate if the distance is known.

When the counting value for the current batch has been reached, the inlet belts 200, 202 stop and the outlet belts 204, 206 accelerate between five and eight times the speed of the inlet conveyor 122. The cartons 100 in the separation zone 212 that are not in contact with the outlet belts are maintained in a stopped position by the inlet belts. The cartons 100 that are pinched between the outlet belts are accelerated and separated from the initial shingled stream 120 which is kept stopped in the section of the inlet belts 200, 202. The inlet belts 200, 202 must be stopped fast enough to prevent an additional carton from being caught by the outlet belts 204, 206. The stopping distances are generally from 5 to 10 cm. Other values are possible.

When the sensor 220 detects the end of the last carton 100 of the separated batch, the inlet belts 200, 202 restart at their functioning speed in proportion with the speed of the inlet conveyor 122 and the outlet belts, 204, 206 slow down to the same speed as the inlet belts, 200, 202. The stopping distance for the inlet belts, 200, 202 ideally remains the same for all speeds so that the separation is done in the same way.

The distance between the separation zone 212 and the batch separation sensor 220 directly affects the length of separation between batches. The longer the separation, the more time the diverting device 160 has to change position between the two batches and vice versa. However, the longer the separation, the longer the inlet section is stopped, which can cause an accumulation of the cartons 100 at the inlet 222 because the inlet conveyor 122 continues to advance the initial shingled stream 120. All subsequent systems allow this variation in shingled stream thickness caused by the accumulation of cartons. However if this accumulation is too large, there can be a complete overlapping of the cartons 100 at the inlet 222, which would cause the sensor 210 to make a counting error.

Figure 20:
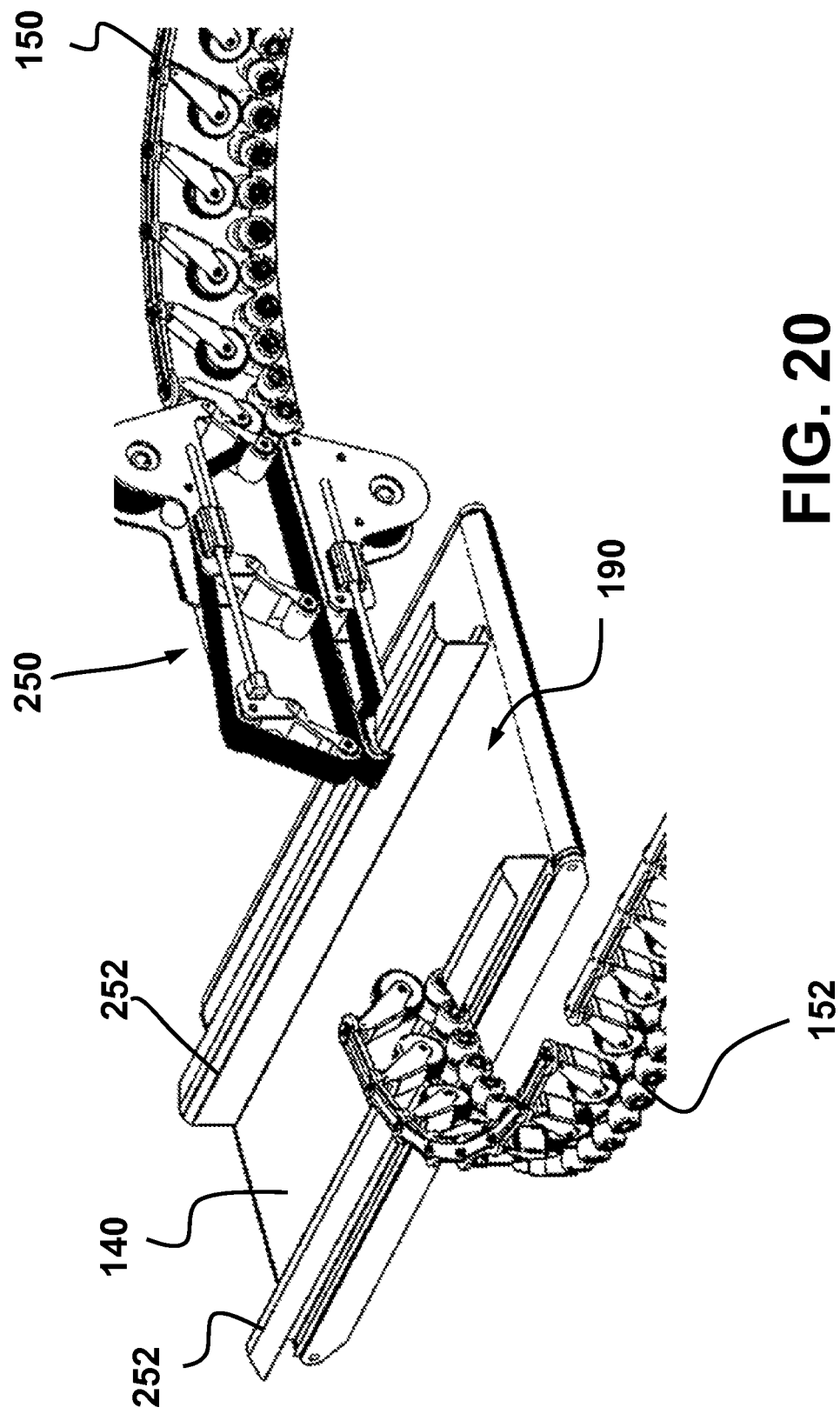
FIG. 20 is an enlarged isometric view showing the details of the system outlet in FIG. 4.

FIG. 20 is an enlarged isometric view showing the details of the outlet 134 of the system 130 in FIG. 4.

In the illustrated example, the first lateral deviation conveyor 150 ends in an extensible section 250, which allows for the adjustment of the distance between two outlet guides 252 as a function of the width of the cartons 100 along the X-axis, which corresponds to the travel direction of the cartons 100 in the lateral deviation conveyor 150. Each guide 252 is disposed longitudinally on each side of the outlet conveyor 140. The guide 252 on the right is supported by the extensible section 250 above the surface.

Depending on the desired implementation, each lateral deviation conveyor 150, 152 can end with an extensible section 250 to allow the centering of the cartons 100 in the common receiving zone 190 of the system 130.

These extensible sections 250 have a different construction from that shown in FIG. 20.

Figure 21:
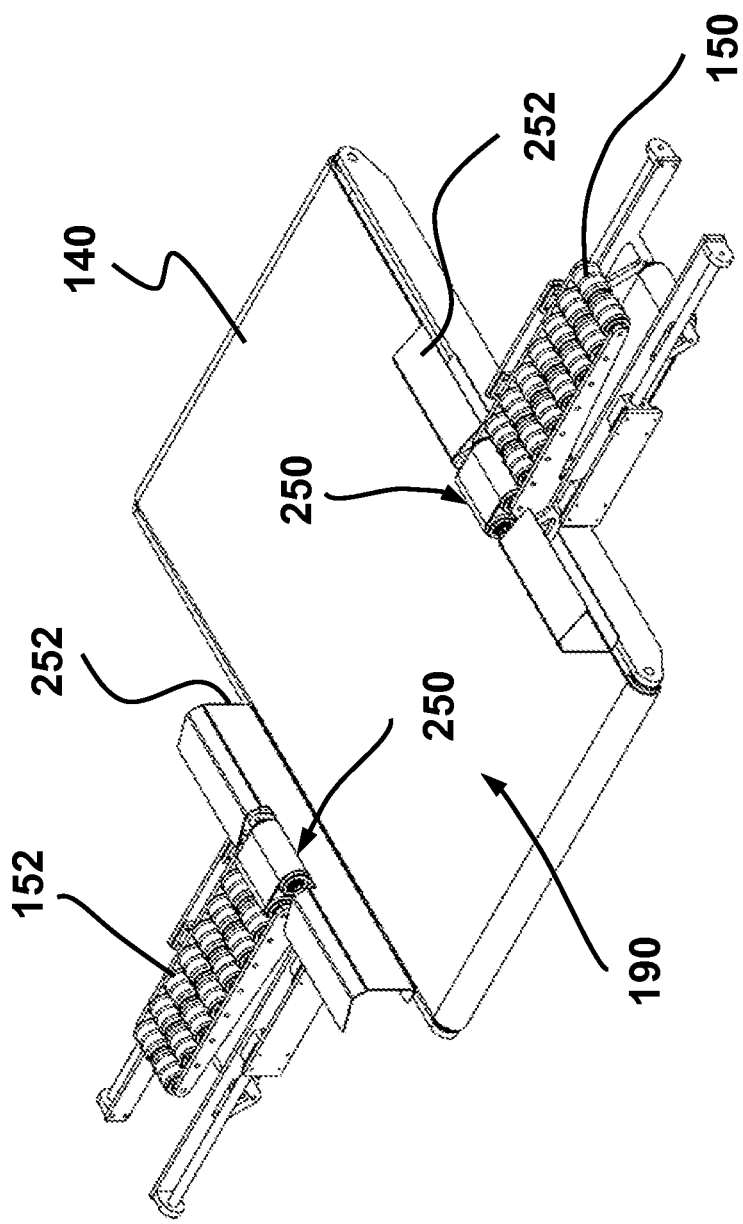
FIG. 21 shows the common receiving zone with an extensible section on each side at its maximum open position.

FIG. 21 shows the common receiving zone 190 with an extensible section 250 on each side at maximum open position. These extensible sections 250 have a different construction from that shown in FIG. 20. Only the bottom part of the extensible sections 250 is illustrated for sake of illustration.

Figure 22:
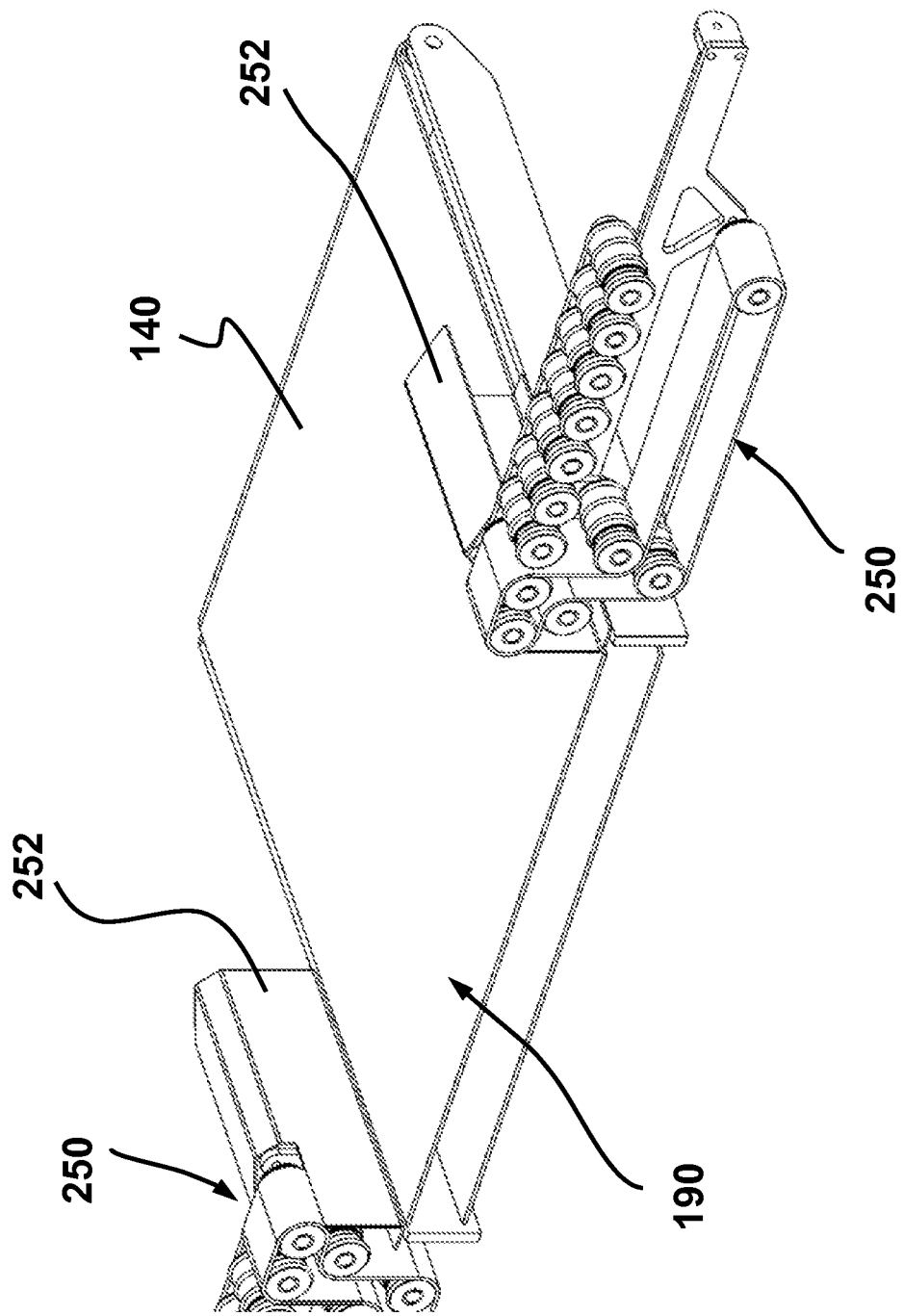
FIG. 22 is a cross sectional view of what is shown in FIG. 21.

FIG. 22 is a cross sectional view of what is shown in FIG. 21.

Figure 23:
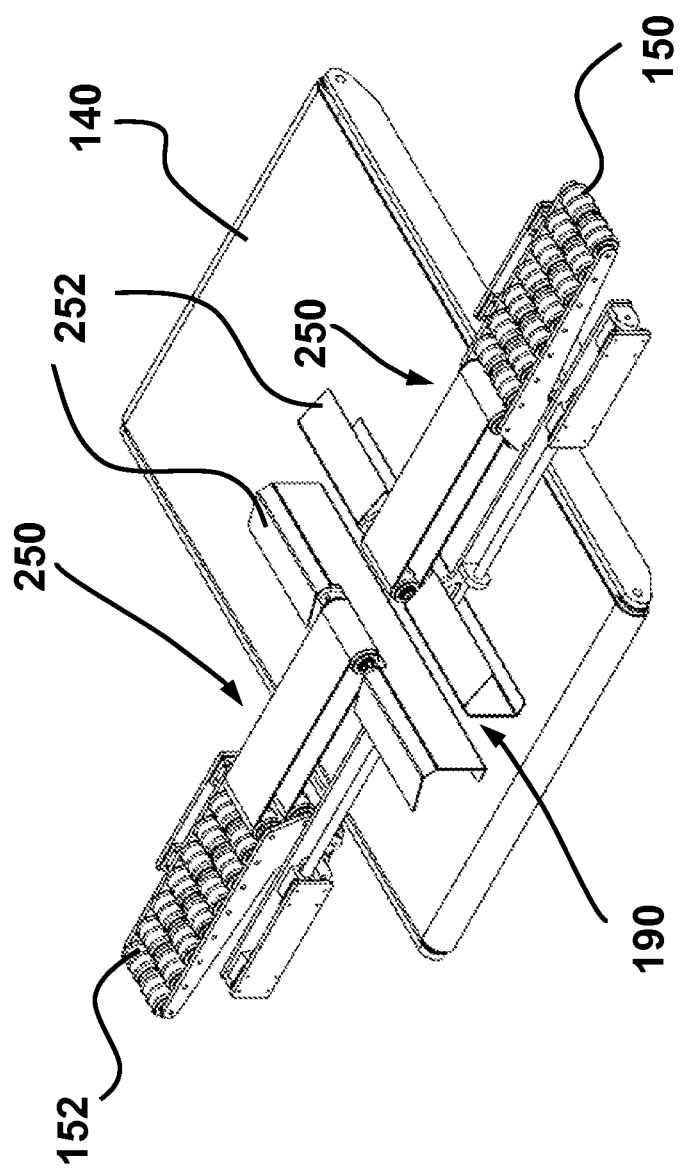
FIG. 23 shows the common receiving zone with the extensible section on each side at minimum open position.

FIG. 23 shows the common receiving zone 190 with the extensible section 250 of each side at minimum open position.

Figure 24:
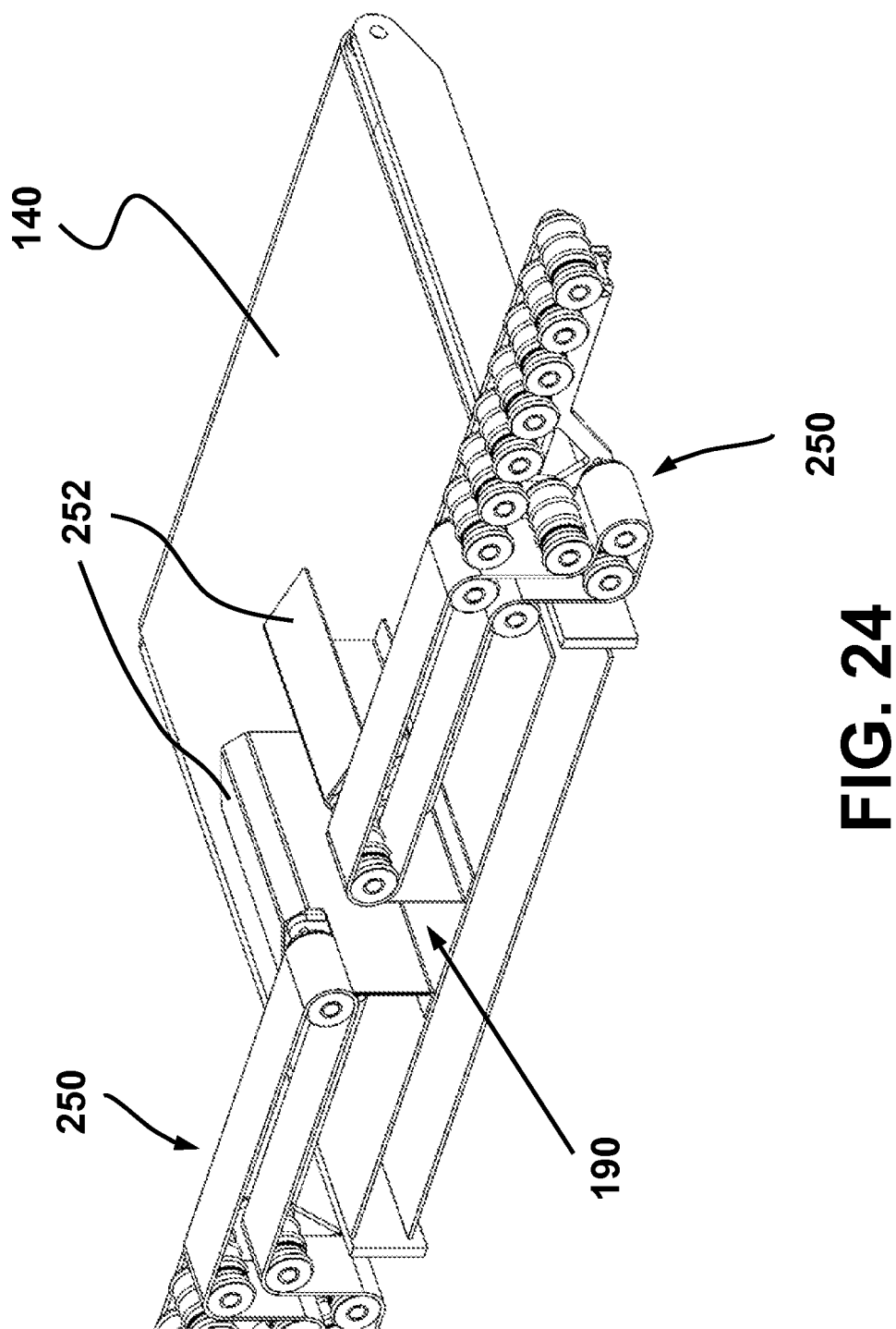
FIG. 24 is a cross sectional view of what is shown in FIG. 23.

FIG. 24 is a cross sectional view of what is shown in FIG. 23.

Each extensible section 250 includes an extensible belt and a mechanism to vary the exposed length.

In certain implementations, it may be beneficial to provide a central conveyor 300, to be added between the two deep lateral deviation conveyors 150, 152. This central conveyor 300 would allow for the initial shingled stream 120 to pass straight through, that is directly into the common receiving zone 190. The separation device 170 can also be used to create batches when that is necessary. The diverting device 160 will include a third outlet path to allow the cartons 100 to be directed to the central conveyor 300.

Figure 25:
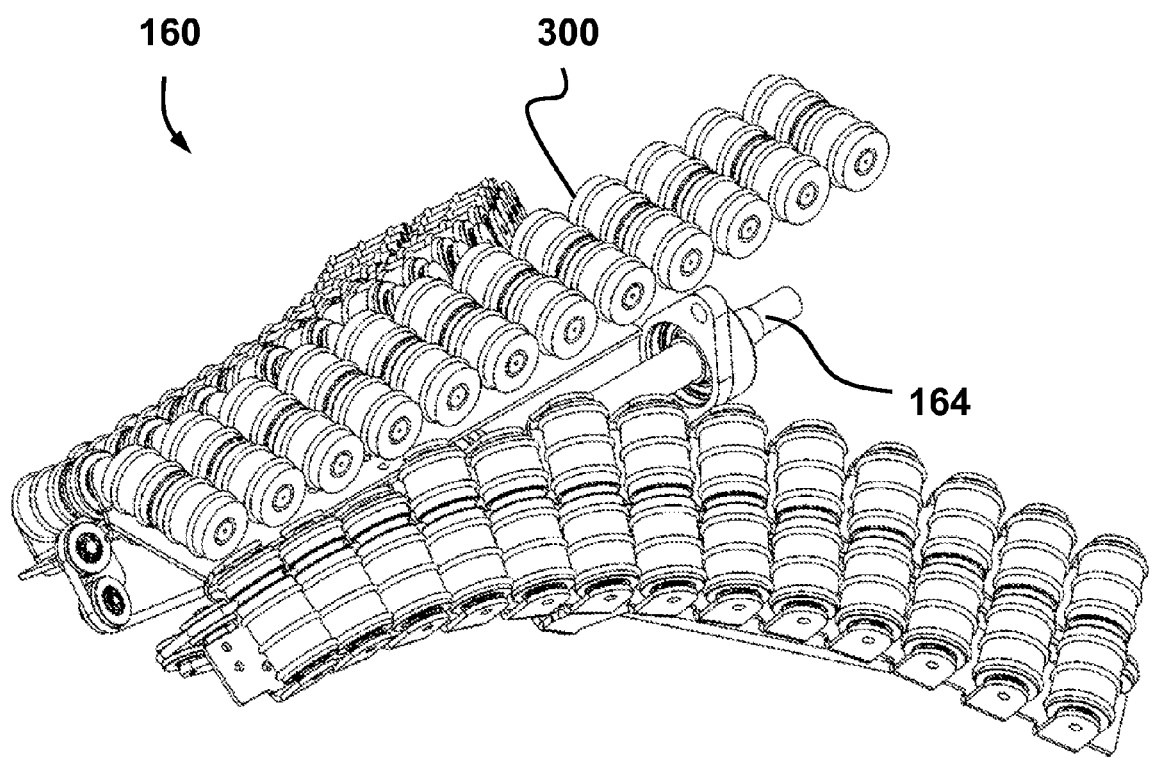
FIG. 25 is an isometric view of an example of a three-way diverting device.

FIG. 25 is an isometric view of the three-way diverting device 160.

Figure 26:
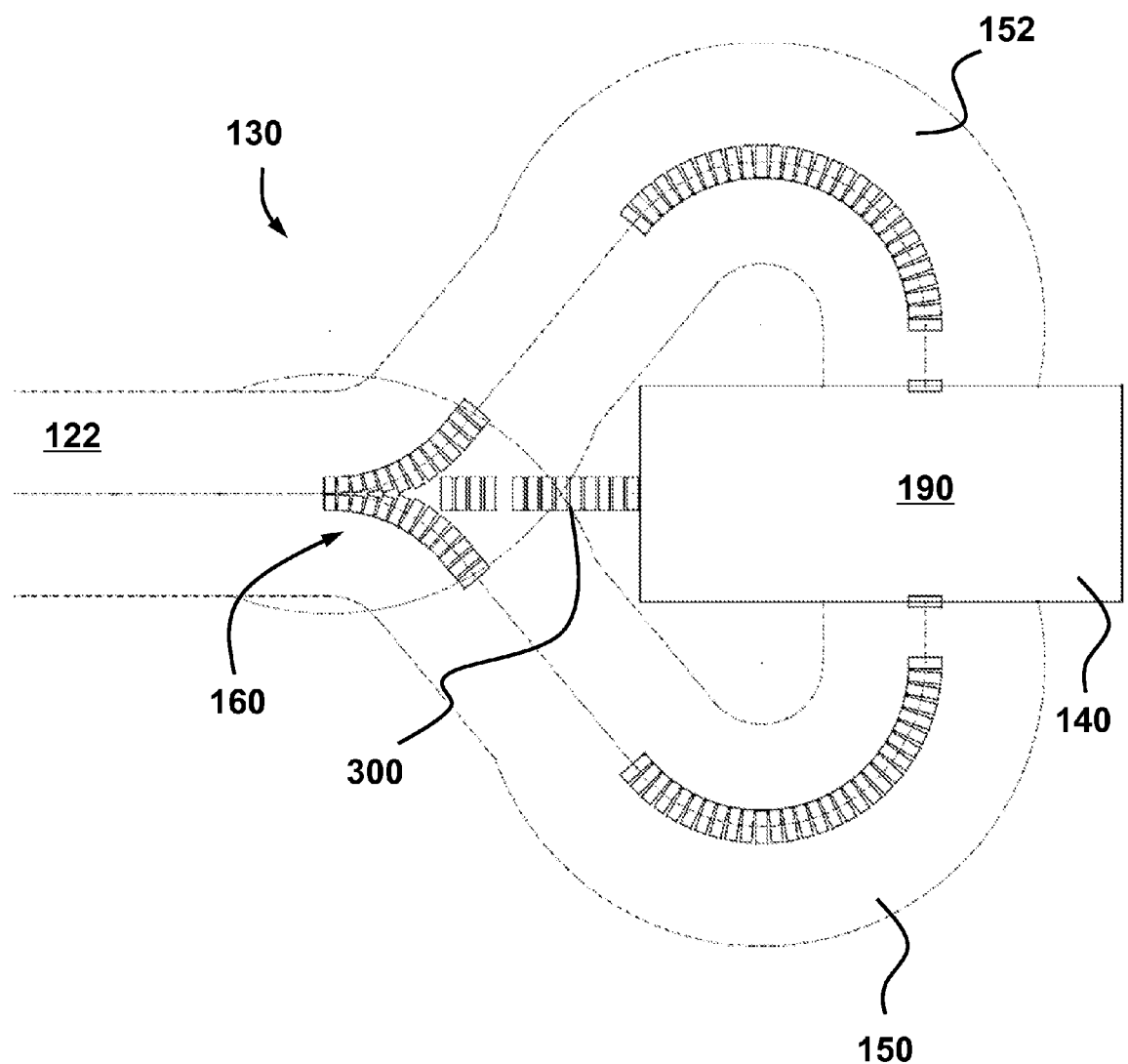
FIG. 26 is a view similar to FIG. 18 but showing an example of a system configuration with a central conveyor.

FIG. 26 is a view similar to FIG. 18 but showing an example of a configuration of the system 130 with a central conveyor 300.

Figure 27:
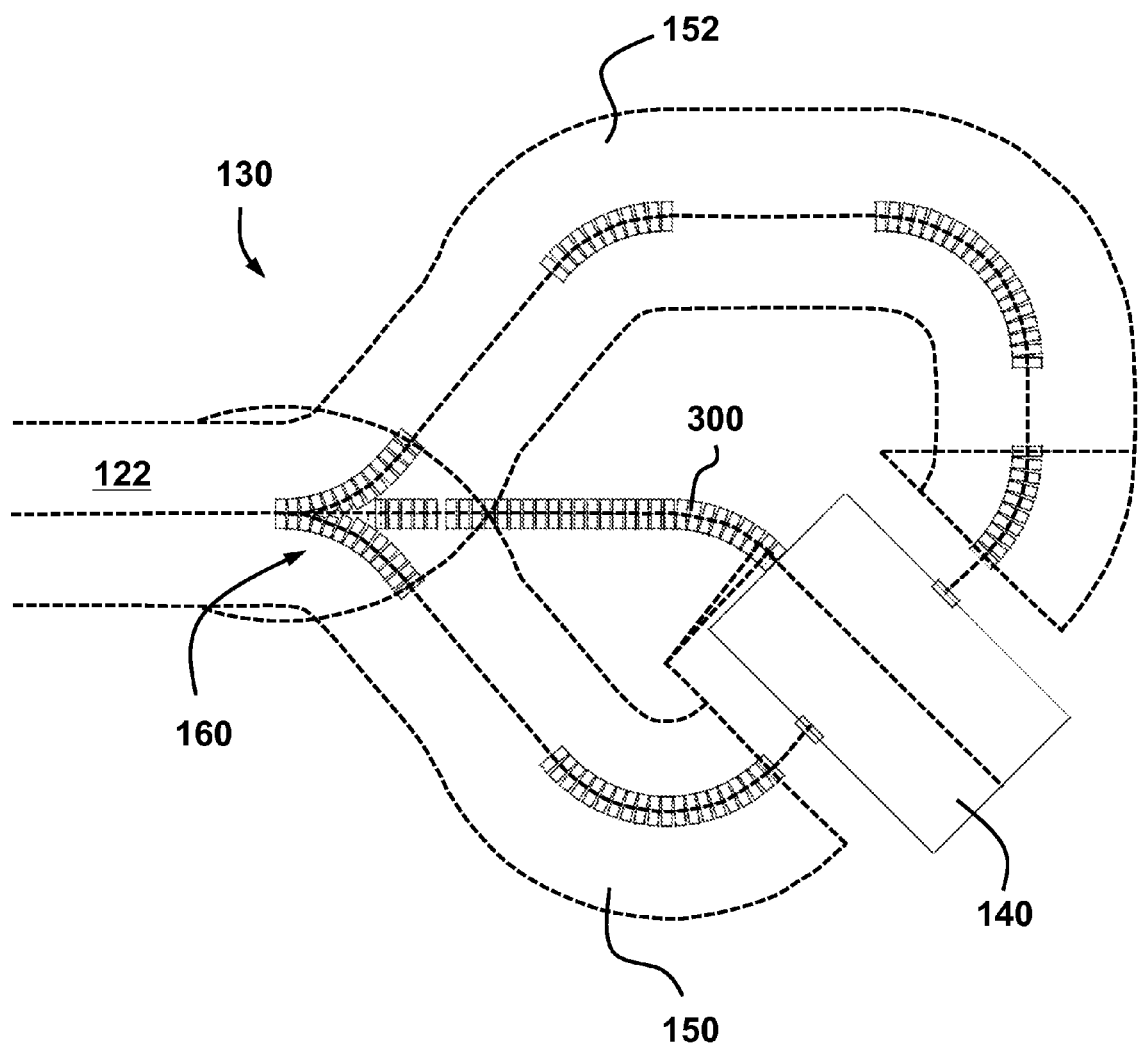
FIG. 27 is also a view similar to FIG. 18 but showing another example of a system configuration with the central conveyor.

FIG. 27 is also a view similar to FIG. 18 but showing another configuration example of a system 130 with the central conveyor.

It should be noted that, if necessary, the system 130 can be used to reposition the cartons 100 using only one of the two lateral deviation conveyors 150, 152. In this case, the other is not used. This possibility could be interesting in certain cases if there is no need to invert the cartons 100 with reference to one another. Pivoting the cartons 100 between the inlet 132 and the outlet 134 of the system 130 is only made to the right or the left, depending on which lateral deviation conveyor is used. It is also possible to include a helicoidal inverter device for repositioning the cartons 100 one by one by pivoting them around the X-axis and/or the Y-axis (FIG. 1).

The system 130 can be manufactured by known means of assembly from its various constituting parts. These known means of assembly can include, for instance at least one of the following techniques: welding, screwing, fitting, bonding, crimping, riveting, plating.

As can be appreciated, the present concept proposes a system to invert multidirectional and polyvalent batches to separate and invert batches of objects, for instance folding cartons, in different orientations. The system can also allow pivoting shingled streams continuously or in batches in one or more directions by a simple adjustment. Moreover, it can also provide, through simple adjustment, several batch orientations by using one or more dynamic sections to invert objects.

Depending on the desired implementation, the batch inversion system can include:
- at least one helicoidal inversion system to individually pivot objects over 180 degrees in one of the transport branches, the helicoidal inversion system comprising a belt twisting 180 degrees, unsupported in its transport section between the two ends, the helicoidal inversion system being attached at each end and allowing individual objects only to pivot over 180 degrees and not to pass straight through;
- at least one helicoidal inversion system to individually pivot objects 180 degrees in one of the transport branches, the helicoidal inversion system comprising a belt twisting 180 degrees, unsupported in its transport section between the two ends, the helicoidal inversion system being dynamic at one end and allowing individual objects to pivot over 180 degrees or to pass straight therein, depending on the setting;
- at least one transversal diverting device allowing both object shingled streams and individual objects to pass therein, the diverting device including two upper and bottom section sets mounted about pivot axes activated by one actuator, each of the upper and bottom section sets having two possible positions, namely open and closed, each upper and bottom section set being in the opposite position to the other set;
- a device for the individual separation of objects, including a conveyor and one or more pressure wheels being supported by the inlet shingled stream, each of the pressure wheels can be moved so that its position is a function of the width of the object requiring an effective separation; and/or
- a right-angle transfer device including, for example, of a fixed conveyor section and another conveyor section that can be adjusted according to the dimensions of the object, the adjustable section of the conveyor comprising an extensible belt allowing for an attached inlet on the transport section side and an adjustable outlet on the right-angle transfer side.

Also proposed is a process to manufacture a system as described above, consisting of the assembly of its constituting elements by known methods.

The use of the system can permit for instance to separate and invert object batches in one or more adjustable orientations; and/or to permit, through a simple adjustment, a batch separation/inversion function or a shingled stream/batch turning.

Such a system (and/or applications) offers at least one of the following advantages:
- allow batches of flat-disposed objects to be inverted without any of them becoming folded or deformed;
- can combine several transformation functionalities for a shingled stream of flat-disposed objects into the same system in order to reduce the required floor space.

These functionalities can be described, for example, as follows:
- allow the separation of a shingled stream of flat-disposed objects into batches; and/or
- allow the separation of a shingled stream of flat-disposed objects into individual objects separated by a distance; and/or
- allow diverting of shingled streams of flat-disposed objects, batches of flat-disposed objects or individual flat-disposed objects to different transport branches without folding or deforming any flat-disposed objects; and/or
- allow moving shingled streams of flat-disposed objects, batches of flat-disposed objects or individual flat-disposed objects into curved sections in order to change their orientation; and/or
- allow the right-angle transfer of shingled streams of flat-disposed objects, batches of flat-disposed objects or individual flat-disposed objects; and/or
- allow the helicoidal inversion of individual flat-disposed objects; and/or
- allow batches of flat-disposed objects or individual flat-disposed objects to be recombined into a continuous shingled stream of packed flat-disposed objects that have a different configuration that that of the inlet shingled stream of flat-disposed objects.

The system can also be defined as a system for handling objects in a flat configuration and disposed in an initial moving shingled stream, the system including: a device that separates the initial shingled stream into batches of objects, a device to divert batches into transport branches, at least one device to pivot the objects of a batch around an axis perpendicular to the plane of this batch; and at least one device to recombine batches into a reconstituted shingled stream including inverted object batches; with these batches moving substantially in the same plane as that of the initial shingled stream or along planes substantially parallel to the initial shingled stream plane. The manufacturing process for such a system and the use of the system to complete numerous automated functions, such as separating the initial moving shingled stream into batches of objects, diverting batches into transport branches, rotating the objects of a batch around an axis perpendicular to the plane of this batch, inverting at least one object of a batch by the X- or Y-axis, or a combination of two, the recombination of batches in a reconstituted shingled stream of inverted object batches and continuous rotation of the initial shingled stream into one or the other of the transport branches, are also part of what is proposed.

The present detailed description and the corresponding figures are only examples. A person working in the field will recognize that variants can be made while remaining within the frame of the proposed concept.

REFERENCE NUMBERS 100 carton
102 side
104 main panel
106 main panel
110 container
112 batch 120 initial shingled stream
122 horizontal conveyor
124 travel direction
130 repositioning system
132 system inlet
134 system outlet
140 outlet conveyor
150 first lateral deviation conveyor
152 second lateral deviation conveyor
160 diverting device
162 drive shaft
170 separation device
180 transit shingled stream
182 transit shingled stream
184 transit shingled stream
190 common receiving zone
192 exit shingled stream
200 upper belt (inlet section of separation device)
202 bottom belt (inlet section of separation device)
204 upper belt (outlet section of separation device)
206 bottom belt (outlet section of separation device)
210 carton counting sensor
212 separation zone
220 batch separation sensor
222 inlet
250 extensible section
252 outlet guide
300 central conveyor
302 third outlet path

What is claimed is:

1. A system for repositioning flat-disposed objects arranged in an overlapping manner at a system inlet, the objects having a same initial orientation with reference to one another along a substantially linear and horizontal inlet path, the system including:
  a first lateral deviation conveyor and a second lateral deviation conveyor, each having an inlet located downstream the system inlet and an outlet located immediately upstream the system outlet, the first lateral deviation conveyor defining a first deviation path having at least one horizontal and curved segment and the second lateral deviation conveyor defining a second deviation path having at least one horizontal and curved segment, the outlet of the first lateral deviation conveyor and the outlet of the second lateral deviation conveyor being laterally spaced apart from one another and being respectively located on a right side and on a left side of a common receiving zone located at the system outlet, the two deviation paths having directions that are, at the outlets to the lateral deviation conveyors, substantially parallel and diametrically opposite to one another; and
  a diverting device having one inlet and two distinct outlets, one for each lateral deviation conveyor, the inlet of the diverting device being in registry with the object inlet path and each diverting device outlet being located, one at a time, at a respective position where the outlet is immediately upstream the inlet of the corresponding lateral deviation conveyor to sequentially create, between the system inlet and the system outlet, a first transport circuit passing through the first deviation path and ending on the right side of the common receiving zone, and a second transport circuit passing through the second deviation path and ending on the left side of the common receiving zone, to invert the orientation of the objects transported in the first transport circuit with reference to the objects transported in the second transport circuit.

2. The system according to claim 1, wherein the first deviation path is, at the inlet of the first lateral deviation conveyor, toward the right with reference to the object inlet path, the second deviation path being, at the inlet of the second lateral deviation conveyor, toward the left with reference to the object inlet path.

3. The system according to claim 1, wherein the first lateral deviation path and the second lateral deviation path are substantially horizontal.

4. The system according to claim 3, wherein the first lateral deviation path and the second lateral deviation path are uninterrupted.

5. The system according to claim 1, wherein the diverting device includes a frame on which two conveyor sections are mounted, the frame being mounted so as to pivot on a bottom base around a pivot axis that is substantially parallel to the object inlet path.

6. The system according to claim 1, further including:
  a separation device to create successive and spaced-apart shingled streams, the separation device being located at the system inlet and upstream the diverting device inlet.

7. The system according to claim 6, wherein the successive shingled streams created by the separation device include approximately a same number of objects.

8. The system according to claim 1, wherein the objects to be repositioned have at least one main panel made of a substantially inflexible material, each object being continuously maintained in a flat configuration between the inlet and the outlet of the system so as to prevent any visible degradation of the substantially inflexible material.

9. The system according to claim 1, wherein the common receiving zone located at the system outlet includes an outlet conveyor to receive the objects transported in the right and left transport circuits, the outlet conveyor moving along an outlet path that is substantially perpendicular to the directions of the deviation paths in the common receiving zone.

10. The system according to claim 1, wherein the objects passing through the first transport circuit are pivoted over a first angle in the horizontal plane between the inlet and the outlet of the system, and the objects passing through the second transport circuit are pivoted over a second angle in the horizontal plane between the inlet and the outlet of the system, the first angle and the second angle totaling 180 degrees when added together.

11. The system according to claim 1, wherein the objects are supported above and below along the entire right transport circuit and the entire left transport circuit.

12. The system according to claim 1, wherein at least one part of the lateral deviation conveyors includes motorized rollers.

13. The system according to claim 1, wherein the lateral deviation conveyors include rollers that apply a downward pressure on a top of the objects.

14. The system according to claim 1, wherein the objects have a variable thickness.

15. The system according to claim 1, wherein the objects are folding cartons, the folding cartons being repositioned by the system while the folding cartons are in a flat configuration.

* * * * *